(12) United States Patent
MacInnis et al.

(10) Patent No.: US 9,635,334 B2
(45) Date of Patent: Apr. 25, 2017

(54) AUDIO AND VIDEO MANAGEMENT FOR PARALLEL TRANSCODING

(71) Applicant: Broadcom Corporation, Irvine, CA (US)

(72) Inventors: Alexander Garland MacInnis, Los Altos, CA (US); Hongtao Zhu, San Jose, CA (US); Jason William Herrick, Pleasanton, CA (US); Brian Francis Schoner, Fremont, CA (US); Junlin Li, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/041,024

(22) Filed: Sep. 30, 2013

(65) Prior Publication Data

US 2014/0153909 A1     Jun. 5, 2014

Related U.S. Application Data

(60) Provisional application No. 61/732,536, filed on Dec. 3, 2012, provisional application No. 61/798,211, filed on Mar. 15, 2013.

(51) Int. Cl.
| | |
|---|---|
| *H04N 5/932* | (2006.01) |
| *H04N 9/80* | (2006.01) |
| *H04N 19/436* | (2014.01) |
| *H04N 19/40* | (2014.01) |
| *H04N 21/242* | (2011.01) |
| *H04N 5/91* | (2006.01) |
| *H04N 9/79* | (2006.01) |

(Continued)

(52) U.S. Cl.
CPC ............. *H04N 9/80* (2013.01); *H04N 5/91* (2013.01); *H04N 9/7921* (2013.01); *H04N 19/40* (2014.11); *H04N 19/436* (2014.11); *H04N 21/242* (2013.01); *H04N 9/8205* (2013.01); *H04N 21/8456* (2013.01); *H04N 21/8547* (2013.01)

(58) Field of Classification Search
USPC ........ 386/201, 203, 207, 211, 214, 217, 220
See application file for complete search history.

(56) References Cited

U.S. PATENT DOCUMENTS 5,537,440 A * 7/1996 Eyuboglu et al. ............. 375/245
6,493,386 B1 * 12/2002 Vetro .................... H04N 21/84
                                                375/240.1

(Continued)

*Primary Examiner* — Helen Shibru
(74) *Attorney, Agent, or Firm* — Foley & Lardner LLP

(57) ABSTRACT

Disclosed are various embodiments directed to transcoding a bit stream comprising audio and video frames that contains discontinuities. The video and/or audio portion of the bit stream may be divided into segments, where some of the segments are transcoded in parallel using a plurality of transcoder devices. In some embodiments, a discontinuity is detected in the bit stream before encoding, where the discontinuity is associated with a shift in a set of time stamps associated with the bit stream. A magnitude of the discontinuity is determined. The transcoding system aligns at least a portion of the audio frames to the series of video frames according to at least the discontinuity and the magnitude of the discontinuity. In other embodiments, the discontinuity is detected after encoding by analyzing time stamps that have been established during the transcoding process.

23 Claims, 13 Drawing Sheets

(51) Int. Cl.
  *H04N 21/845* (2011.01)
  *H04N 21/8547* (2011.01)
  *H04N 9/82* (2006.01)

(56) References Cited

U.S. PATENT DOCUMENTS

| | | | |
|---|---|---|---|
| 8,270,487 B1* | 9/2012 | Kizhepat et al. | 375/240.12 |
| 9,307,258 B2* | 4/2016 | MacInnis | H04N 19/40 |
| 2001/0033619 A1* | 10/2001 | Hanamura et al. | 375/240.26 |
| 2004/0179455 A1* | 9/2004 | Maruyama | G11B 7/24082 369/111 |
| 2006/0288117 A1* | 12/2006 | Raveendran | H04L 12/66 709/236 |
| 2007/0071405 A1* | 3/2007 | Choi | H04L 69/22 386/239 |
| 2009/0257508 A1* | 10/2009 | Aggarwal | H04N 5/783 375/240.25 |
| 2010/0296451 A1* | 11/2010 | Li | H04W 74/006 370/328 |
| 2013/0083859 A1* | 4/2013 | Nemiroff et al. | 375/240.25 |
| 2013/0236158 A1* | 9/2013 | Lynch et al. | 386/231 |
| 2013/0276048 A1* | 10/2013 | Krasic et al. | 725/116 |
| 2014/0119457 A1* | 5/2014 | MacInnis | H04N 19/40 375/240.26 |
| 2015/0359007 A1* | 12/2015 | Liu | H04L 5/0005 370/329 |

* cited by examiner

AUDIO AND VIDEO MANAGEMENT FOR PARALLEL TRANSCODING

CROSS REFERENCE TO RELATED PATENTS/PATENT APPLICATIONS

The present application claims the benefit of and priority to U.S. Provisional Patent Application titled, "Audio and Video Management for Parallel Transcoding," having Ser. No. 61/732,536, filed Dec. 3, 2012, which is hereby incorporated by reference herein in its entirety for all purposes.

The present application also claims the benefit of and priority to U.S. Provisional Patent Application titled, "Audio and Video Management for Parallel Transcoding," having Ser. No. 61/798,211, filed Mar. 15, 2013, which is hereby incorporated by reference herein in its entirety for all purposes.

BACKGROUND

Media items such as movies, television shows, music, etc. may be digitally stored as media files in various file formats. Media devices that playback these media files may be limited to a set of file formats that are supported by the media device. For example, a media device may not support particular formats such as, for example, high definition, high frame rates, various compression formats, etc. To successfully play back media files in such devices, the media files may need to be transcoded. Transcoding is a process that relates to converting a file from one format into another format. Transcoding may involve completely decoding each picture or audio frame of a media file to a raw format, processing the raw format by performing any number of specified operations, and encoding the raw format to a target format. Media devices may have limited storage capacity, and it may be desirable to transcode media files into a format with a smaller file size. By performing transcoding on a media file, the media file may be converted from an unsupported file format to a supported file format, and the media file may be converted from a larger file size to a smaller file size, or may otherwise undergo another type of conversion.

A media file that is sent to a transcoding system may be made up of a video file stream and an audio file stream. Each file stream may be associated with a respective set of original time stamps. Discontinuities in these time stamps may exist which may result in a misalignment between the audio stream and video stream. Discontinuities may be caused, for example, by splicing the audio and video streams. Thus, it may be the case that a transcoding system transcodes a media file with discontinuities.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
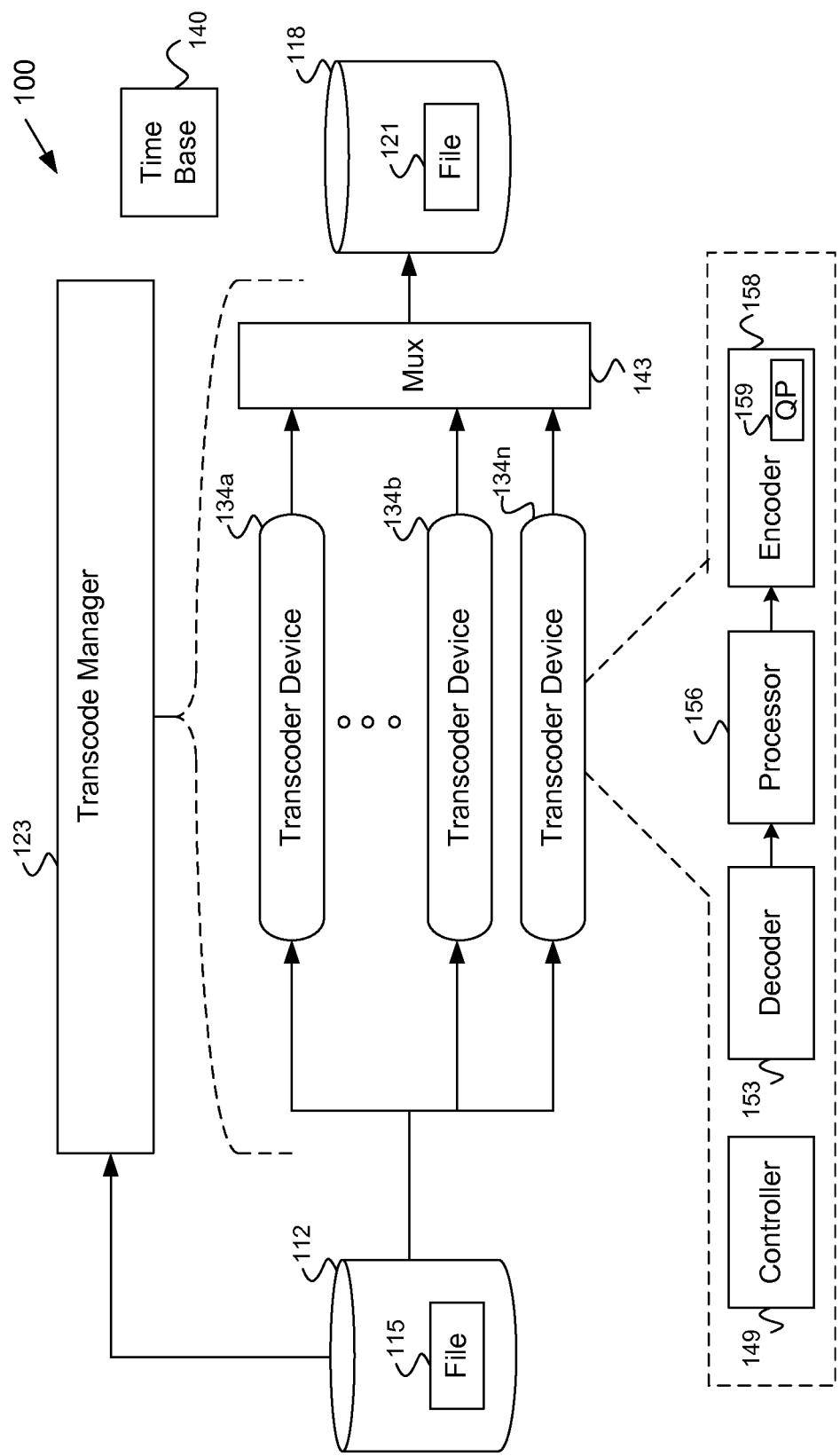
FIG. 1 is a drawing of an example of a transcoding system, in accordance with various embodiments of the present disclosure.

The present disclosure relates to transcoding a media file to generate a transcoded media file. A media item such as, for example, a video, image, picture, graphic, television show, movie, song, audio content, audio book, etc., may be stored as a digital file in a variety of formats or a combination of formats. For example, a media file may be encoded in accordance with a particular standard, file format, frame rate, media quality, or any other format for storing a digital media file. Media files stored in an original format may not be suitable for presentation in particular media devices, or they may be too large to store in particular media devices, or for any reason it may be desirable to reduce the size of the media files. Thus, a format conversion is required to modify the media file in order to render it presentable in a target media device or reduce the size of the media file to render it suitable for storage in or transmission to a target media device. Transcoding may be used to convert a file from one format to another format. In one or more embodiments, full transcoding involves completely decoding the media file to a raw format, processing the raw format by performing any number of specified operations, and encoding the raw file to a target format. Alternatively, transcoding without completely decoding the media file may be used.

Various embodiments of the present disclosure are directed to transcoding a media file that has a discontinuity associated with times stamps of the media file. A discontinuity, for example, may reflect a sudden shift in a time base, where the time base is implied by a set of time stamps associated with a bit stream of the media file. According to one embodiment among others, the transcoding system processes the video stream of the media file while maintaining the original video time stamps of the pictures in the video stream and processes the audio stream of the media file while maintaining the original audio time stamps of the pictures in the video stream. The transcoding system may generate and/or assign additional video time stamps and audio time stamps. A multiplexer that is responsible for aggregating the transcoded video and audio streams may then determine if a discontinuity exists by analyzing the original audio and video time stamps as well as the audio and video time stamps that have been newly assigned or generated. Accordingly, the multiplexer may align the transcoded audio and video streams to achieve audio video synchronization. The multiplexer may adjust the video time stamps and audio time stamps to effect the alignment. The multiplexer may discard the original video and audio time stamps.

Alternatively, in another embodiment, the transcoding system detects a discontinuity by analyzing time stamps of an input bit stream. The time stamps may be Program Clock Reference (PCR) values and may be referred to as PCR values. PCR values may be included in the input bit stream to indicate the time base of the input bit stream. The transcoding system may determine a point of discontinuity based on the PCR values as well as the frame intervals of pictures in the bit stream. In response to a point of discontinuity, the encoder may adjust the presentation timing of the audio bit stream portion of the output bit stream to achieve audio/video synchronization. The encoder may adjust the presentation timing of the audio bit stream portion of the output bit stream by either generating time stamps that reflect the adjusted presentation timing, or by modifying time stamps in order to reflect the adjusted presentation timing According to various embodiments, the transcoding system may segment the video stream and/or audio stream into corresponding input segments to effectuate a parallel processing. Each segment of the audio and/or video stream is allocated to an appropriate transcoder. Each transcoder may establish one or more time stamps, where establishing a time stamp may comprise generating a time stamp or modifying a previously defined time stamp. The multiplexer aggregates the transcoded input segments based at least upon the established time stamps to generate a transcoded output of the media file.

Moving onto FIG. 1, shown is a drawing of an example of a transcoding system 100, in accordance with various embodiments of the present disclosure. A transcoding system 100 may be implemented as at least a portion of a set top box or computing device configured to handle media files. The transcoding system 100 comprises a source memory storage 112, a destination memory storage 118, a transcode manager 123, a plurality of transcoder devices 134a-n, and a multiplexer (mux) 143.

Non-limiting examples of the source memory storage 112 are magnetic tapes, magnetic floppy diskettes, magnetic hard drives, memory cards, solid-state drives, USB flash drives, optical discs, or random access memory (RAM) including, for example, static random access memory (SRAM) and dynamic random access memory (DRAM), or magnetic random access memory (MRAM). In addition, the source memory storage 112 may be a read-only memory (ROM), a programmable read-only memory (PROM), an erasable programmable read-only memory (EPROM), an electrically erasable programmable read-only memory (EEPROM), or other type of memory device.

The source memory storage 112 is configured to store an input media file 115. The input media file 115 may represent an audio and/or video program such as, for example, a television show, a movie, a song, an audio book, etc. The source memory storage 112 may be implemented as a portion of a set top box for storing broadcasted media. To this end, the input media file 115 may be a program transmitted to a set top box over a network. The input media file 115 may comprise audio data and video data. The audio data be represented as an audio stream and the video data may be represented as a video stream.

According to various embodiments, the audio stream of the input media file 115 comprises a series of audio frames, where the audio stream is associated with an audio sample rate. Each audio frame may be associated with a respective original audio time stamp. The original audio time stamp may specify, for example, a presentation time for playback. The original audio time stamp is an intrinsic property of an audio frame that exists before the audio frames are transcoded in the transcoding system 100. In some cases, not every audio frame is coded with its own respective original audio time stamp. However, such an audio frame may have an original audio frame time stamp that is interpolated based on the original audio times stamps of other audio frames. Thus, an original audio frame time stamp may be coded or interpolated.

The video stream of the input media file 115 comprises a series of pictures, where the video stream is associated with a video frame rate. Each picture may be associated with a respective original video time stamp. The original video time stamp may specify, for example, a presentation time for playback. The original video time stamp is an intrinsic property of a picture that exists before the pictures are transcoded in the transcoding system 100. In some cases, not every video frame is coded with its own respective original video time stamp. However, such a video frame may have an original video time stamp that is interpolated based on the original video times stamps of other video frames. Thus, an original video frame time stamp may be coded or interpolated. In addition, the video stream may comprise PCR values that represent the time base of the video stream. The transcoding system 100 may derive an internal time 140 base from the PCR values. Each of the pictures in the video stream has a frame interval. A frame interval may comprise, for example, an amount of time that should elapse between the presentation of successive pictures. The presentation times of the pictures may be indicated by the original video time stamps. In this respect, the time base 140 is calculated and updated by the transcoding system. A time base 140 may comprise a System Time Clock (STC), an oscillator, a counter, or any other mathematical calculator for measuring time.

A discontinuity may exist, where a discontinuity is a change in value of a time base that may be represented or indicated by the set of original audio time stamps and/or set of original video time stamps and/or set of PCR values. Discontinuities may be marked according to a particular syntax or they may be unmarked. Unmarked discontinuities may complicate the parallel transcoding process as the audio stream and/or video stream is divided into input segments for parallel processing.

The destination memory storage 118 may comprise, for example, magnetic tapes, magnetic floppy diskettes, magnetic hard drives, memory cards, solid-state drives, USB flash drives, optical discs, or random access memory (RAM) including, for example, static random access memory (SRAM) and dynamic random access memory (DRAM), or magnetic random access memory (MRAM). In addition, the destination memory storage 118 may be a read-only memory (ROM), a programmable read-only memory (PROM), an erasable programmable read-only memory (EPROM), an electrically erasable programmable read-only memory (EEPROM), or other type of memory device.

The destination memory storage 118 is configured to store an output media file 121. The output media file 121 is a transcoded version of the input media file 115. To this end, the output media file 121 expresses the same substantive content as the input media file 115. The output media file 121 may express a subset of the content of the input media file 115. However, the output media file 121 is encoded in a format that differs from the format of the input media file 115. A different format of the output media file 121 may conform to the same standard as the input media file 115 while having a different bit rate or file size. The destination memory storage 118 may be implemented in a media device that is separate from a media device that comprises the source memory storage 112. For example, the source memory storage 112 may be implemented as a portion of a set top box and the destination memory storage 118 may be a portion of a remote media device such as a computing device configured to present the output media file 121 to a user. A media device may be, for example, a laptop computer, desktop computer, notepad, notebook, tablet, cellular telephone, personal digital assistant (PDA), set top box, digital camera, portable media player, or any other computing device configured to playback a media file. Alternatively, the destination memory storage 118 may be implemented in a media device that is the same as a media device that comprises the source memory storage 112.

The transcode manager 123 is configured to manage the transcoding of the input media file 115. In various embodiments, the transcode manager 123 is implemented as at least a portion of a microprocessor. The transcode manager 123 may include one or more circuits, one or more microprocessors, or any combination thereof. In yet other embodiments, the transcode manager 123 may include one or more software modules executable within one or more processing circuits. The transcode manager 123 may further include computer-readable medium. The computer-readable medium may store instructions and/or code to cause the transcode manager 123 to manage transcoding operations in the transcoding system 100.

The transcode manager 123 may retrieve the input media file 115 and prepare the input media file 115 for transcoding. In various embodiments, the transcode manager 123 divides the video stream into input segments and/or divides the audio stream into input segments. In this respect, the transcode manager 123 handles the input media file 115 as an audio bit stream and/or video bit stream and allocates audio segments and/or video segments to various transcoder devices 134*a-n*. A transcoder device 134*a-n* may comprise an audio transcoder device 134 for transcoding audio segments or alternatively a video transcoder device 134 for transcoding video segments. The transcode manager 123 may send a segment of audio or video to a transcoder device 134*a-n* as a stream without specifying a segment length or ending point in the stream. When the transcoder device 134*a-n* is nearing completion of the transcoding process of a segment or has completed the transcoding process of a segment, the transcoder device 134*a-n* may indicate to the transcode manager 123 to stop feeding the input segment stream. Alternatively, the transcode manager 123 may allocate an input segment as a stream while specifying a default or nominal length or ending point. The transcode manager 123 is also configured to monitor each transcoder device 134*a-n* by managing one or more transcoder parameters.

According to various embodiments, the transcode manager 123 may assign a respective time stamp to each audio output segment and each video output segment. For example, the transcode manager 123 obtains time samples based on a time base 140 for establishing one or more time stamps for each output segment. The time base 140 is global for the transcoding system 100 for establishing time stamps for the audio streams and/or video streams. In other embodiments, an encoder that encodes a particular audio segment or video segment may use a virtual time base to generate time stamps for the audio segment or video segment. The encoder may use a virtual time base that begins at a default value, such as zero, to generate time stamps.

The transcode manager 123 may be configured to initiate one or more transcoder processes for transcoding the input media file 115. Each transcoder process may be executed concurrently to processes portions of the input media file 115 in parallel. The transcode manager 123 may be configured to initiate one or more transcode processes by utilizing one or more transcoder devices 134*a-n*. Furthermore, the transcode manager 123 may operate a multiplexer (mux) 143 for sequencing the audio outputs and video outputs of the transcoder devices 134*a-n* for generating a transcoded output media file 121.

The mux 143 is configured to handle the outputs of each transcoder device 134*a-n*. The mux 143 may also assemble each of the outputs to generate the output media file. The output media file 121 may then be written to the destination memory storage 118. In various embodiments, the mux 143 is communicatively coupled to a memory buffer to store the transcoder device outputs in a queue. According to various embodiments the mux 143 is configured to aggregate the transcoded video outputs and the transcoded audio outputs to generate a transcoded output media file 121. In this respect, the mux 143 stitches together the video output segments to generate a transcoded video stream and stitches together the audio output segments to generate a transcoded audio stream. The mux 143 may stitch together and multiplex transcoded audio and video output segments to generate a multiplexed output stream. For example, a multiplexed output stream may conform to the MPEG-2 Systems (ISO/IEC 13818-1) Transport Stream specification. According to various embodiments, the mux 143 detects discontinuities associated with the audio stream and video stream. If a discontinuity is detected, the mux 143 may respond by aligning the transcoded audio stream with the transcoded video stream, as is discussed in further detail below.

The transcoding system 100 comprises a plurality of transcoder devices 134*a-n*. Each transcoder device 134*a-n* is configured to process portions of the input media file 115 to effectuate parallel transcoding. A transcoder device 134*a-n* performs one or more transcoder processes. In this respect, a transcoder device 134*a-n* may be configured to perform multiple transcoder processes concurrently to transcode various inputs concurrently. A transcoder device 134*a-n* may be a video transcoder or an audio transcoder. In various embodiments, each transcoder device 134*a-n* is implemented as at least a portion of a microprocessor. Each transcoder device 134*a-n* may include one or more circuits, one or more microprocessors, or any combination thereof. To this end, the various transcoder devices 134*a-n* may be implemented by one circuit and/or microprocessor or may be implemented by multiple circuits and/or microprocessors such that the functionality of the transcoder devices 134*a-n* is distributed across one or more circuits and/or one or more microprocessors. In yet other embodiments, each transcoder device 134a-n may include one or more software modules executable within one or more processing circuits. Each transcoder device 134a-n may further include computer-readable medium. The computer-readable medium may store instructions and/or code to cause the transcoder device 134a-n to transcode portions of the input media file 115.

Each transcoder device 134a-n is configured to receive a segment of the input media file 115 and generate a corresponding output segment. An output segment is a set of video pictures or audio frames or samples associated with an input segment. Output segments are described with respect to at least FIG. 5. At the output of a transcoder, an output segment is a transcoded version of the input segment. Each transcoder device 134a-n comprises a respective controller 149, a respective decoder 153, a respective processor 156, and a respective encoder 158.

According to various embodiments, when processing a particular input segment, each transcoder device 134a-n is configured to receive one or more time stamps from the transcode manager 123 for associating the output segment associated with the particular input segment with the time stamp(s). For example, the transcode manager 123 may assign the initial picture or initial audio frame a time stamp. In various embodiments, a video transcoder device 134a-n determines time stamps for the remaining pictures in the video output segment based on the assigned time stamp of the initial picture and the known video frame rate or frame interval(s). In this respect, the frame rate may be translated to a predetermined interval of time between time stamps of adjacent pictures in presentation order. In the case of an audio transcoder device 134a-n, the audio transcoder device 134a-n may determine time stamps for the remaining audio frames in the audio output segment based on the assigned time stamp of the initial audio frame and the known audio sample rate. The audio sample rate may be translated to a predetermined interval of time between time stamps of adjacent audio frames in presentation order.

The controller 149 for each transcoder device 134a-n provides an interface between the transcoder device 134a-n and the transcode manager 123. For example, the controller 149 may allow for a transcoder device 134a-n to be enabled or disabled. The controller 149 may indicate a transcoding progress of the transcoder device 134a-n to the transcode manager 123. The controller 149 may also maintain a workload queue of a transcoder device 134a-n that indicates an amount of work scheduled to be performed by a transcoder device 134a-n. Transcoding progress, for example, may indicate whether a transcoder is busy or not.

The decoder 153 of each transcoder device 134a-n is configured to decode and/or decompress received audio or video inputs into a raw format. For example, the decoder 153 portion of a video transcoder device 134a-n may convert input media file segments into raw pixel data.

The processor 156 of each transcoder device 134a-n is configured to process the raw outputs of the decoder 153. For video transcoder devices 134a-n, the processor 156 is a pixel processor that may perform pixel processing functions. Non-limiting examples of pixel processing are picture size adjustment, interlacing/de-interlacing, color space conversion, noise reduction, and image enhancement. Pixel processing may comprise changing a format. For example, a format change may be conversion to or from a high definition (HD) and a different definition, conversion to or from a standard definition (SD) and a different definition, 2-channel conversion, de-interlacing, etc. With regard to audio transcoder devices 134a-n, the processor 156 performs various audio processes such as filtering, noise suppression, or any other audio processes. In the case of audio or video, after the processor 156 receives a decoded input media file segment and processes the input media file segment, the processor 156 sends the processed input media file segment to the encoder 158.

The encoder 158 for each transcoder device 134a-n is configured to encode processed input media file segments by encoding the processed input media file segments to a target format. For video transcoder devices 134a-n, the encoder 158 encodes each processed input media file segment according to a quantization parameter (QP) 159. Depending on the complexity of the input segment, the encoder 158 may adjust the QP 159 to achieve an optimal output. Although the encoder of each transcoder device 134a-n may dynamically adjust the QP 159, the transcode manager 123 may also control the QP 159 for each encoder 158. For example the transcode manager 123 may initialize each QP 159 to an initial value for controlling the uniformity of each QP 159 of each encoder 158. In various embodiments, the transcode manager 123 may direct the QP 159 value of each encoder 158 to converge at a predetermined QP range. Moreover, according to various embodiments, the encoder 158 responds to detected discontinuities by adjusting aspects of the transcoded audio stream to achieve synchronization with the transcoded video stream, as is discussed in further detail below.

Parallel Transcoding

Figure 2:
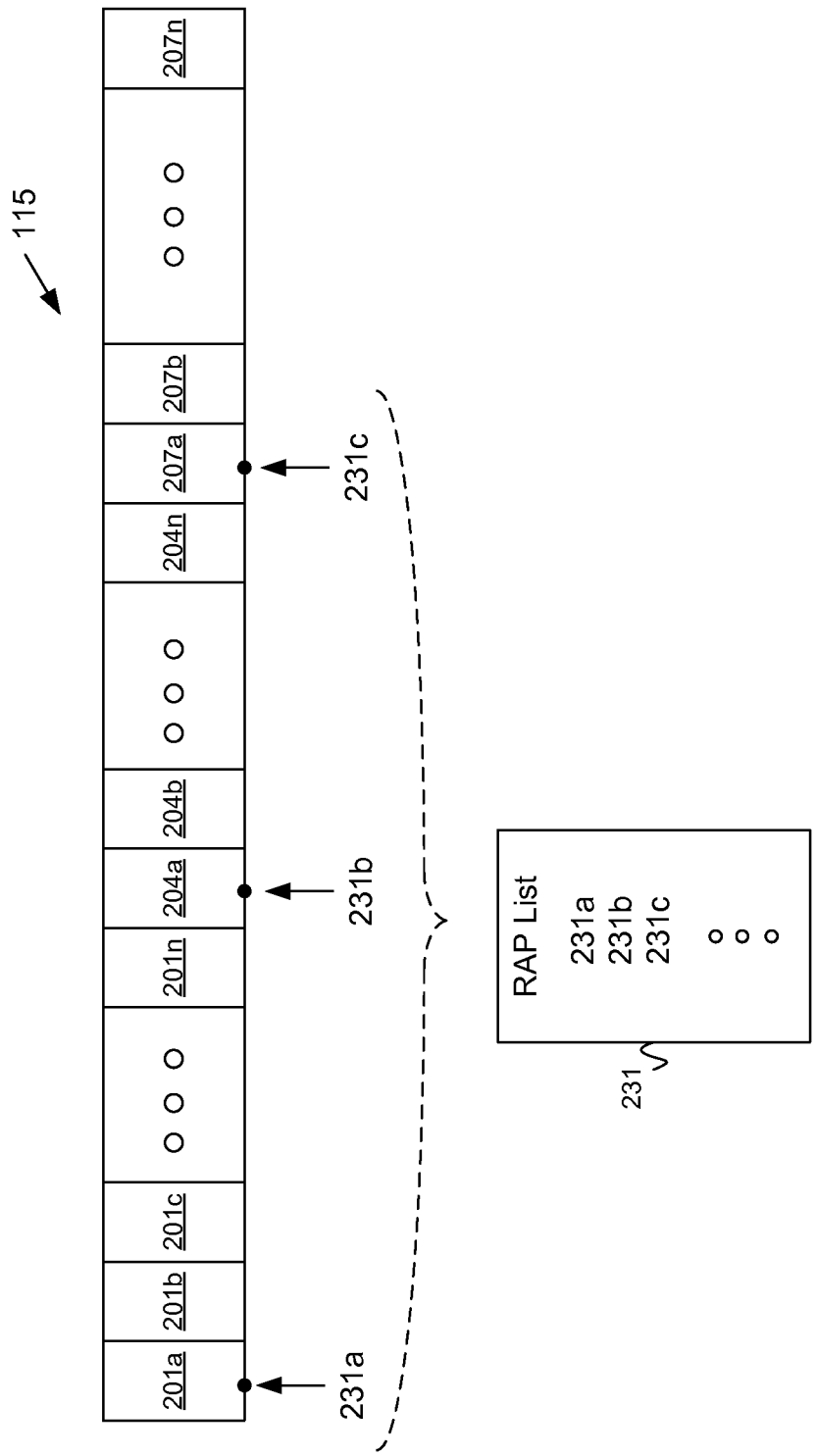
FIG. 2 is a diagram of an example of an input media file within the transcoding system of FIG. 1, in accordance with various embodiments.

Next, in FIG. 2 shown is a diagram of an example of an input media file 115 within the transcoding system 100 of FIG. 1, in accordance with various embodiments. FIG. 2 depicts the video stream of an input media file 115 expressed in terms of a series of pictures that may ultimately be ordered according to an order of presentation. The order of the pictures in the bit stream may differ from the order that the pictures are meant to be presented, which may be the case for particular video compression standards. The input media file 115 may also be expressed in terms of a bit stream. In this respect, a series of bits make up an individual picture.

The video stream comprises a plurality of pictures 201a-n, 204a-n, 207a-n. The video stream also comprises random access points (RAPs) 231a-231c. Each RAP 231a-c is a picture with characteristics that enable decoding starting from the RAP 231a-c. A RAP list 231 identifies RAPs that exist in the input bit stream of the input media file 115.

In various embodiments, the RAP list 231 may be obtained from a process that indicates the locations of RAPs 231a-c in a stream as the stream is being received and stored in an input media file 115. In alternative embodiments, the RAP list 231 may be obtained by the transcoding system 100 (FIG. 1) that processes the video stream. For example, the transcode manager 123 (FIG. 1) may be configured to parse the bit stream of the video stream and identify a set of RAPs 231a-c. Regardless of how the RAP list 231 is ascertained, the transcode manager 123 may use the RAP list 231 to divide the video stream into segments to facilitate parallel transcoding.

In various embodiments, a RAP 231a-c is an I-picture (intra-coded picture). An I-picture is a fully specified picture that does not require other pictures for decoding. That is to say, I-pictures are independent pictures. Referring to FIG. 2, a first set of pictures 201a-n begins with a first RAP 231a, a second set of pictures 204a-n begins with a second RAP 231b, and a third set of pictures 207a-n begins with a third RAP 231c. A RAP may be any picture that has characteristics that enables decoding starting from that picture.

In various embodiments, each set of pictures 201a-n, 204a-n, 207a-n may comprise a respective last picture 201n, 204n, 207n, where the respective last picture is a P-picture (predicted picture) or a B-picture (Bi-predicted picture). P-pictures and B-pictures are partially specified pictures that require other pictures for decoding.

Figure 3:
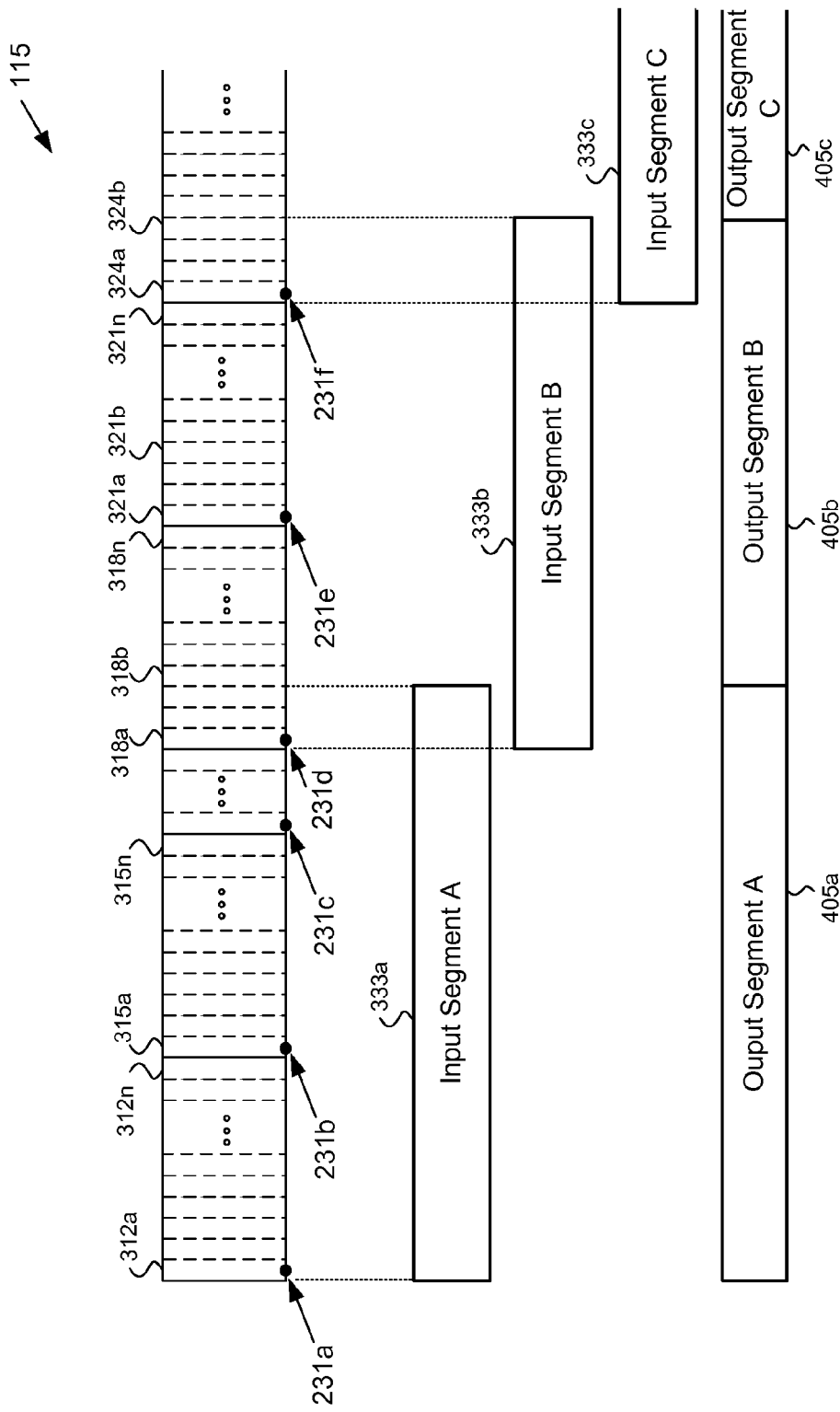
FIG. 3 is a diagram of an example of an input media file within the transcoding system of FIG. 1, in accordance with various embodiments.

Turning to FIG. 3, shown is a diagram of an example of an input media file 115 within the transcoding system of FIG. 1, in accordance with various embodiments. FIG. 3 depicts a video stream of an input media file 115 expressed in terms of a sequence of pictures ordered according to presentation. The input video stream comprises a plurality of RAPs 231a-f. The video stream also comprises a first set of pictures 312a-n, a second set of pictures 315a-n, a third set of pictures 318a-n, a fourth set of pictures 321a-n, and/or any additional subsequent sets of pictures. In addition, FIG. 3 provides a non-limiting example of dividing the video stream into a plurality of input segments 333a-c.

The transcode manager 123 (FIG. 1) may analyze the video stream and determine a RAP list 231 (FIG. 2) for the input media file 115. Based on the location of the RAPs 231a-f, the transcode manager 123 may identify a starting point for each input segment. Each input segment 333a-c begins on a RAP 231a, 231d, 231f. For example, the first RAP 231a of the video stream may indicate to the transcode manager 123 the generation of the starting point for the first input segment 333a.

The transcode manager 123 may be configured to generate each input segment 333a-c according to an optimal length. The length of an input segment 333a-c may be expressed in terms of a number of pictures, an amount of time, a number of bits, a number of RAPs encompassed by the input segment 333a-c, etc. Although each input segment 333a-c is not necessarily identically equal to other input segments 333a-c in terms of length, each input segment 333a-c may be approximately equal in length to other input segments 333a-c.

The transcode manager 123 divides the video stream into input segments to effectuate parallel processing of the input media file 115. When input segments 333a-c are too long, the start-up costs to realize the benefits of parallel processing may be high. For example, if a video stream is divided into four input segments 333c, where each segment is approximately a quarter in terms of length, then the benefits of parallel processing are not realized for the first quarter of the transcoding process.

When input segments are too short, the efficiency of a parallel transcoding system may be reduced due to overhead. The use of short segments may also increase the visibility or audibility of certain audio/visual artifacts/abnormalities in the output stream. For example, by separating video stream into short segments, and stitching the short transcoded segments together, the number of stitches increases and this may increase the occurrence of discontinuous values of some parameters in the transcoded output.

In various embodiments, the input segment length is approximately 10 seconds. According to this target length, the transcode manager 123 may find an end picture 318b, 324b for each input segment 333a-c. For example, the transcode manager 123 may identify the nearest RAP 231d, f that is approximately 10 seconds beyond a respective starting picture 312a, 318a, 324a, for each input segment 333a-c. Based upon the nearest RAP 231d, f, the transcode manager 123 may add a predetermined length beyond the nearest RAP 231d, f in order to determine an ending picture for each input segment 333a-c. For example, the end picture of Input Segment A 333a may include a number of additional pictures 318a-b beyond the starting picture of Input Segment B 333b in order to provide an overlap for use in processing by a processor 156 (FIG. 1), as is described in further detail below.

In other embodiments, a transcoder device 134a-n (FIG. 1) is configured to indicate to the transcode manager 123 to stop feeding an input segment 333a-c when the transcoder device 134a-n has completed or is nearing completion of the transcoding process of the segment. Moreover, additional data beyond the ending picture that is fed to the transcoder device 134a-n may be dropped by the transcoder device 134a-n. To this end, the transcoder device 134a-n may determine the ending picture of an input segment 333a-c.

In the non-limiting example of FIG. 3, the transcode manager 123 identifies a starting picture 312a for the first input segment 333a. The transcode manager 123 identifies a subsequent RAP 231d that is approximately 10 seconds after the starting picture 312a in terms of presentation time. The transcode manager 123 and/or transcoder device 134a-n adds a predetermined length beyond the subsequent RAP 231d to identify the end picture 318b for the first input segment 333a. In this non-limiting example, the predetermined length is four pictures. Thus, the first input segment 333a encompasses a plurality of RAPs 231b, 231c in addition to the subsequent RAP 231d.

To identify the next input segment 333b, the transcode manager 123 sets the starting picture of the next input segment 333b as the last RAP 231d of the previous input segment 333a. This leads to an overlap between each input segment 333a-d. The overlap length is equal to the predetermined length. The predetermined length may be expressed in terms of a number of pictures, a time, a number of bits, etc.

By extending the end picture 318b, 324b to a predetermined length past a subsequent RAP 231d, f respectively, to create an overlap amount, a transcoder device 134a-n (FIG. 1) that transcodes an input segment 333a-d has additional information to adequately decode the last few pictures in an input segment 333a-c. For example, a processor 156 may need a few pictures at the start of an input segment 333a-c in order to produce a first picture that is suitable for use as the first picture of a corresponding output segment 405a-c. An encoder 158 may encode output segments 405a-c. For example, the first picture of output segment B 405b may be the picture immediately following the end picture 318b in presentation order, and the last picture of output segment A 405a may be the end picture 318b. For example, when decoding a target picture, multiple pictures that extend beyond the target picture in presentation order may be needed. For example, with reference to the non-limiting example of FIG. 3, decoding all of the pictures between picture 321n and picture 324a inclusive in presentation order may require at least a portion of subsequent pictures 324a-b, which may follow 324a in bit stream order. By including these subsequent pictures 324a-c as part of input segment B 333b, it is ensured that all of the pictures of input segment B 333b are adequately decoded.

In various embodiments, the transcode manager 123 may select a predetermined length based at least upon the processing functions to be performed by the transcoder devices 134a-n. For example, de-interlacing operations may require using a larger predetermined length than image enhancement operations.

Figure 4:
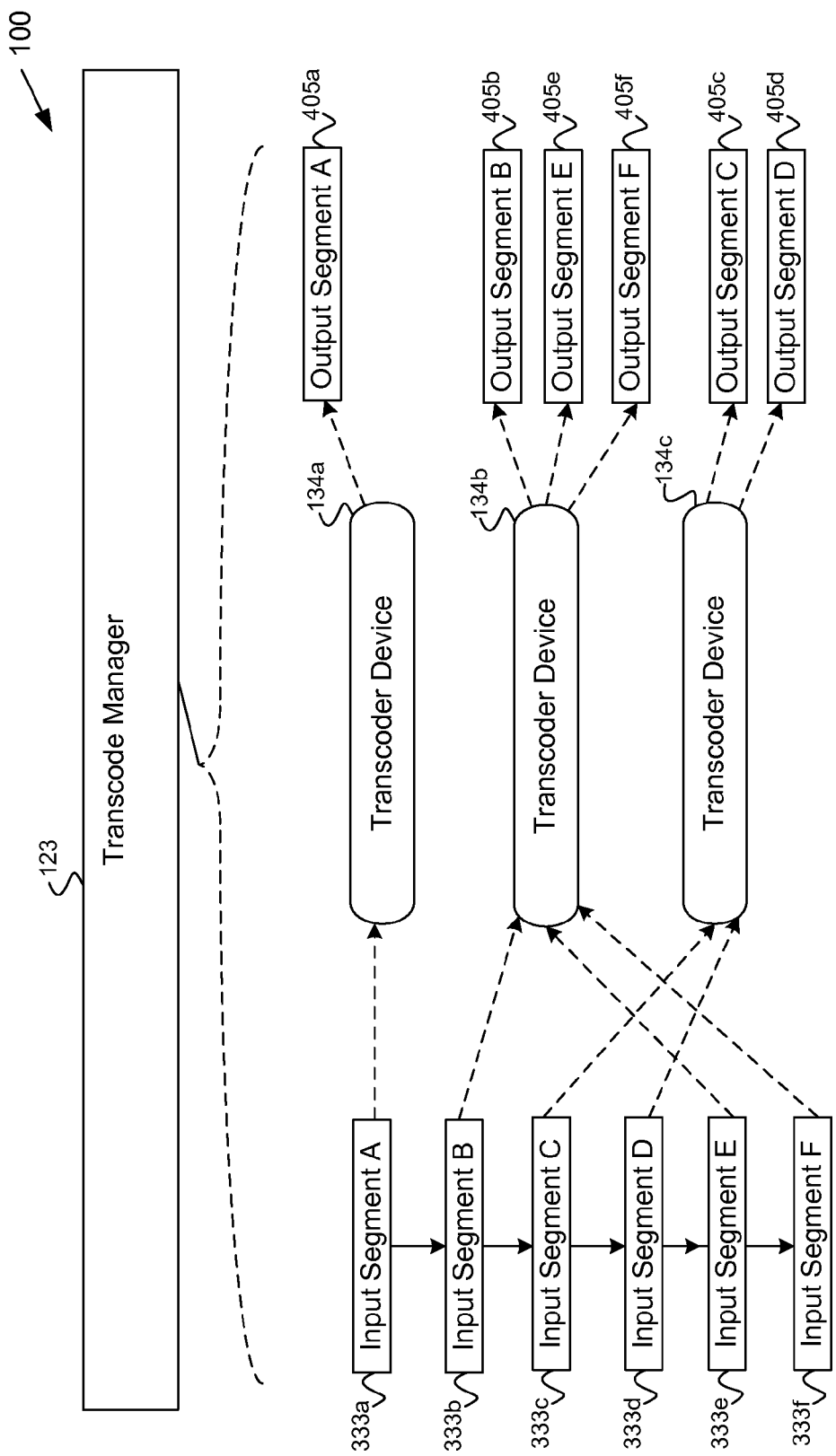
FIG. 4 is a diagram of an example of the operation of a transcode manager implemented within the transcoding system of FIG. 1, in accordance with various embodiments of the present disclosure.

Referring next to FIG. 4, shown is an example of the operation of a transcode manager 123 implemented within the transcoding system 100 of FIG. 1, in accordance with various embodiments of the present disclosure. FIG. 4 provides a non-limiting example of a transcode manager 123 that allocates a plurality of input segments 333a-f to various transcoder processes. These transcoder processes may operate concurrently for transcoding the input segments 333a-f in parallel. For example, the transcode manager 123 may allocate the input segments 333a-f to transcoder processes in three transcoder devices 134a-c. Each transcoder device 134a-c is configured to transcode received input segments 333a-f and generate corresponding output segments 405a-f.

The input segments 333a-f represents video input segments or audio input segments. In the case of audio input segments, the transcoder devices 134a-c are audio transcoders. In the case of video input segments, the transcoder devices 134a-c are video transcoders.

The input segments 333a-f may be arranged in an order of presentation. That is to say, a user who plays back the media file observes the input segments 333a-f arranged in a chronologic sequence according to the presentation order. As the input segments 333a-f are transcoded in parallel by the transcoder devices 134a-c, an order of transcoding may occur such that the outputs of the transcoder devices 134a-c may need to be re-sequenced to maintain the original order of presentation. In this respect, the transcoding order may vary from the presentation order.

In the transcoding system 100 of FIG. 4, each transcoder device 134a-c may be characterized by varying transcoding speeds. For example, the first transcoder device 134a may be an inherently slower transcoder device than the second transcoder device 134b. In this case, a physical implementation of each transcoder device 134a-c may affect transcoding speeds and vary transcoding processing resources for each transcoder device 134a-c.

When segmenting the video stream, each input segment 333a-f may vary in terms of the number of pictures in each input segment or the complexity of the pictures in each input segment. For example, input segment A 333a may comprise a larger number of pictures than input segment C 333c. Thus, transcoding input segment A 333a may require substantially more time than transcoding input segment C 333c. For another example, input segment A 333a may comprise a series of pictures characterized by complex color patterns, motion, and/or movement. Input segment C 333c may comprise a series of monotone pictures with little to no motion or movement. Thus, transcoding input segment A 333a may require substantially more time than transcoding input segment C 333c.

When allocating input segments 333a-f to transcoder devices 134a-c, the transcode manager 123 may determine allocation by analyzing a workload queue of each transcoder device 134a-c. In various embodiments, each transcoder device 134a-c tracks the number of input segments 333a-f scheduled for transcoding. Each transcoder device 134a-c may maintain a counter to count the number of scheduled input segments 333a-f in a work queue. In another example, each transcoder device 134a-c provides an indication when it has completed transcoding each input segment. In other embodiments, each transcoder device 134a-c quantifies a progress status that correlates with the work load of the transcoder device 134a-c. For example, each transcoder device 134a-c may provide an estimated time of completion for the work scheduled in the work queue. The transcode manager 123 may track the work progress of each transcoder device 134a-c and allocate subsequent input segments 333a-f accordingly. For example, each transcoder device 134a-c may provide an indication to the transcode manager 123 indicating whether the transcoder 134a-c is busy or not.

In the non-limiting example of FIG. 4, the transcode manager 123 sends input segment A 333a to the first transcoder device 134a, input segment B 333b to the second transcoder device 134b, and input segment C 333c to the third transcoder device 134c. At this point, each transcoder device 134a-c is presently transcoding a respective input segment 333a-c such that the work queue for each transcoder device 134a-c is populated. Moreover, each transcoder device 134a-c is transcoding the respective input segments 333a-c to generate corresponding output segments 405a-c, respectively.

The next sequential input segment, input segment D 333d, is to be allocated by the transcode manager 123. In various embodiments, the transcode manager 123 considers the transcoding progress of each transcoder device 134a-c. The transcode manager 123 may allocate input segment D 333d to the transcoder device 134a-c that could begin processing input segment D 333d at the earliest point in time. Assuming that the first transcoder device 134a and the second transcoder device 134b have later estimated times of completion than the third transcoder device 134c, the transcode manager 123 may allocate input segment D 333d to the third transcoder device 134c.

The transcode manager 123 may continue allocating input segments 333a-f based on the progress status of each transcoder device. Each transcoder device 134a generates corresponding output segments 405a-f. It may be the case that the output segments 405a-f are generated in an order that differs from the presentation order of the input segments 333a-f.

In various embodiments, the transcode manager 123 is configured to grant other transcoding systems 100 (FIG. 1) access to one or more transcoder devices 134a-c. For example, a first transcoding system 100 may share one or more transcoder devices 134a-c with another transcoding system 100. Each transcoding system 100 may be implemented as a portion of a respective set top box or another computing device. In this respect, a network of set top boxes may be configured to share its transcoder devices 134a-c with other set top boxes. Alternatively, one set top box may be configured to perform a plurality of transcode operations on a plurality of input files or streams concurrently. The transcode manager 123 may allow or deny access to transcoder devices 134a-c managed by the transcode manager 123. Similarly, a transcode manager 123 may request to use one or more transcoder devices 134a-c of another transcoding system 100. In this case, a set of transcoding systems 100 may be networked to facilitate resource sharing of respective transcoder devices 134a-c.

Figure 5:
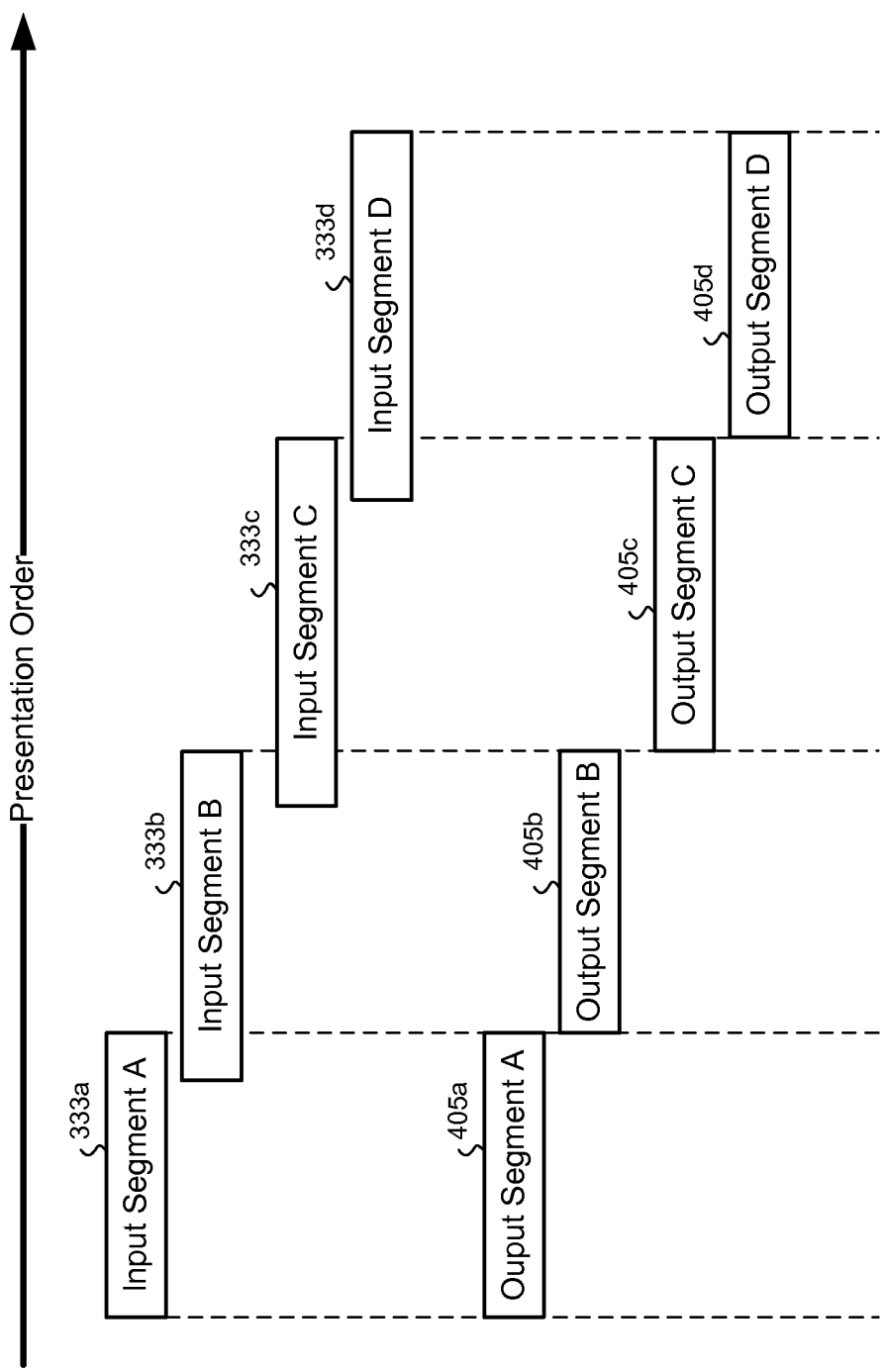
FIG. 5 is a diagram of an example of the operation of the transcoding system of FIG. 1, in accordance with various embodiments of the present disclosure.

Moving to FIG. 5, shown is a diagram of the operation of the transcoding system 100 of FIG. 1, in accordance with various embodiments of the present disclosure. FIG. 5 provides a non-limiting example of sequential video input segments 333a-d and corresponding output segments 405a-d arranged in presentation order. In various embodiments, the output segments 405a-d are configured to form a series of contiguous output segments such that each output segment 405a-d does not overlap with an adjacent output segment 405a-d in the series of output segments.

Input segments 333a-d represent sequential, overlapping time ranges of an input media file 115 (FIG. 1). Thus, each input segment 333a-d may be characterized by a start time and a stop time in terms of presentation time. That is to say, each input segment 333a covers a time range or window of the media item expressed by the input media file 115. For example, assuming the media item is a movie, input segment A 333a covers 0 seconds to 10.5 seconds of the movie and input segment B covers 10.4 seconds to 20.2 seconds of the movie.

Each video input segment 333a-d is sent to a respective transcoder device 134a-n (FIG. 1). A transcoder device 134a-n that receives an input segment 333a-d transcodes the received input segment 333a-d and generates a corresponding output segment 405a-d. Each output segment 405a-d is also characterized by a range of presentation time with a start time and a stop time. For example, following the example of the previous paragraph, output segment A 405a, which is a transcoded version of input segment A 333a, covers 0 seconds to 10.5 seconds of the transcoded movie. Output segment B 405b, which is a transcoded version of input segment B 333b, covers 10.5 seconds to 20.2 seconds of the transcoded movie.

As seen in the non-limiting example of FIG. 5, the output segments 405a-d corresponding to input segments 333a-d are sequential, contiguous, and non-overlapping. For example, the last picture of output segment A 405a immediately precedes the first picture of output segment B 405b. In this respect, the output segments 405a-d form a continuous series of segments that may be assembled to generate a transcoded output media file 121 (FIG. 1).

Each output segment 405a-d covers the same time range of the corresponding input segment 333a-d or covers a subset of the time range of the corresponding input segment 333a-d. For example, the time range for output segment A 405a is 0 seconds to 10.5 seconds, which is the same time range of input segment A 333a. However, the time range for output segment B 405b is 10.5 seconds to 20.2 seconds, which is a subset of the time range of input segment B 333b, which is 10.4 seconds to 20.2 seconds. Thus, the processor 156 (FIG. 1) of a transcoder device 134a-d receives a decoded input segment of a particular window of presentation time and generates a corresponding output segment that is associated with a subset of the window of presentation time of the input segment. This allows for the processor 156 to achieve the benefits of serial transcoding while actually implementing parallel transcoding.

For example, the processor 156 may perform a de-interlacing operation to generate an output segment associated with a particular window of presentation time. To generate the output segment, the input to the de-interlacing operation should be associated with an input window that is large enough to result in a sufficient de-interlacing operation to generate the output segment associated with the particular window of presentation time. In the non-limiting example of FIG. 5, output segment B 405b is associated with a window of 10.5 seconds to 20.2 seconds. The de-interlacing operation used to generate the output segment B 405 may need an input segment associated with a window that spans the range of at least 10.4 seconds to 20.2 seconds. Put another way, to de-interlace decoded pictures associated with the range of 10.5 seconds to 20.2 seconds, the de-interlacing operation may require utilizing decoded pictures that precede 10.5 seconds.

In various embodiments, the first input segment 333a of an input media file 115 covers the same time range as the corresponding output segment 405a. After the first output segment 405a, subsequent output segments are associated with respective time ranges that are subsets of corresponding input segment time ranges.

Figure 6:
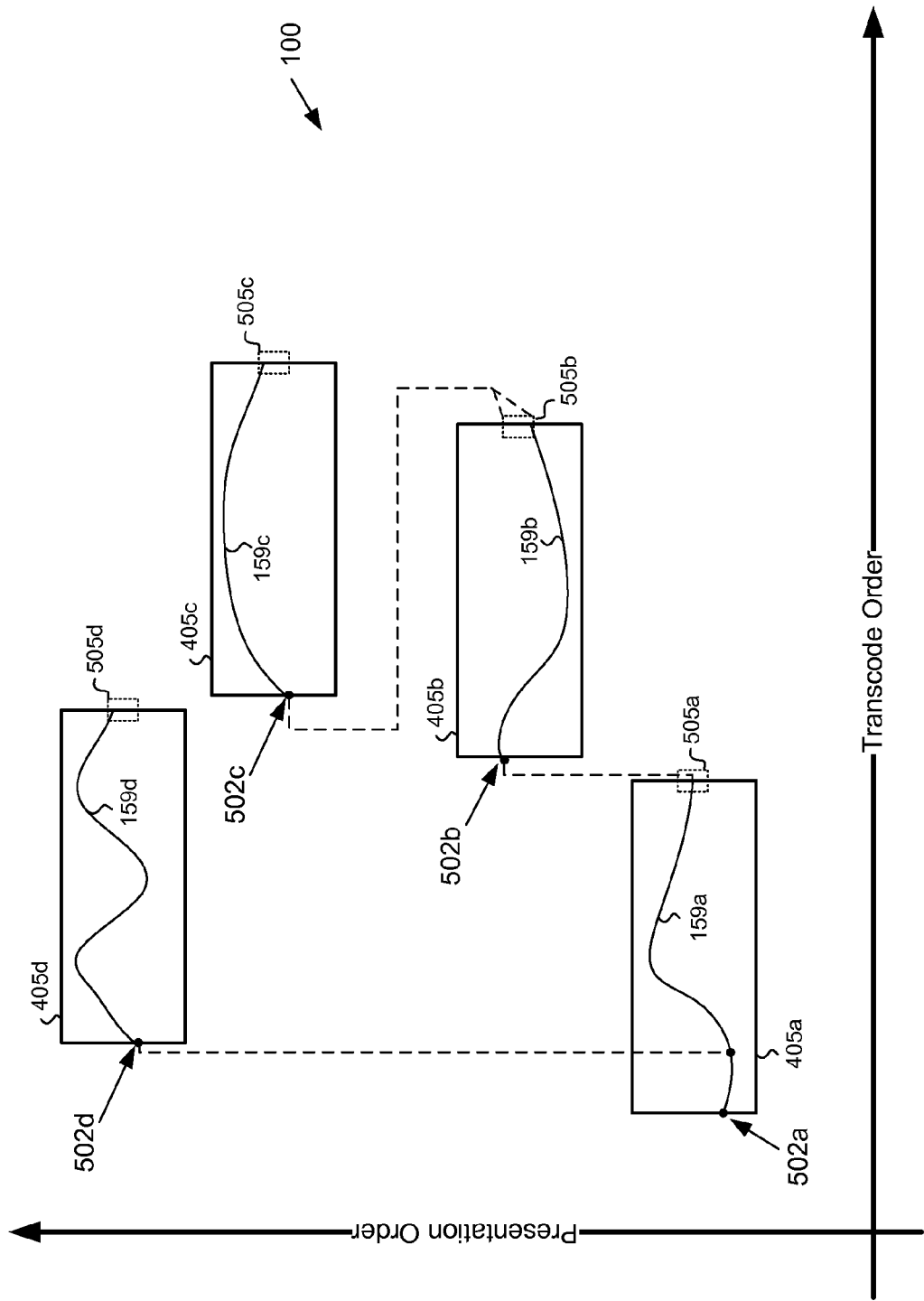
FIG. 6 is a diagram of an example of the operation of the transcoding system of FIG. 1, in accordance with various embodiments of the present disclosure.

Turning now to FIG. 6, shown is an example of the operation of the transcoding system 100 of FIG. 1, in accordance with various embodiments of the present disclosure. FIG. 6 provides a non-limiting example of transcoding four video input segments 333a-d (FIG. 3) using parallel transcoder devices 134a-n (FIG. 1), where each input segment 333a-d is allocated by a transcode manager 123 (FIG. 1) to a respective transcoder device 134a-n. The input segments 333a-d are decoded resulting in corresponding output segments 405a-d. The non-limiting example of FIG. 6 depicts encoding the output segments 405a-d using parallel transcoder devices 134a-n.

Each video input segment 333a-d is arranged along a y-axis in terms of presentation order. Input segment A 333a is first to be presented, input segment B 333b is immediately next, input segment C 333c immediately follows input segment B 333b, and input segment D 333d immediately follows input segment C 333c. The lower the input segment 333a-d is depicted along the y-axis, the earlier the input segment 333a-d is to be presented.

Each input segment 333a-d is also arranged along an x-axis in terms of transcode order. Input segments 333a-d that are closer to the left on the x-axis indicate that the input segments 333a-d are transcoded at an earlier point in time. Thus, input segment A 333a is the first input segment to be transcoded, followed by input segment D 333d, followed by input segment B 333b, followed by input segment C 333c. The staggered transcoding order may result from the parallel transcoder devices 134a-n processing input segments 333a-d at varying points in time. It may be inferred from the example of FIG. 6, that the transcoder device 134a-n that is designated to transcode input segment A 333a is not the same transcoder device 134a-n that is designated to transcode input segment D 333d. This inference is based on the fact that input segment A 333a and input segment D 333d have overlapping transcode times, and the assumption that a transcoder device 134a-n may process an input segment 333a-d one at a time. However, it may be inferred that the transcoder device 134a-n that is designated to transcode input segment A 333a could also be the same transcoder device 134a-n that is designated to transcode input segment B 333b or input segment C 333c. This is due to the fact that the transcode time of input segment A 333a neither overlaps with input segment B 333b nor input segment C 333c. However, a transcoder device 134a-n may be able to process more than one input segment 333a-d concurrently.

FIG. 6 also provides a non-limiting example of the dynamic adjustment of the QP 159a-d of each encoder 158 (FIG. 1) implemented in a corresponding video transcoder device 134a-n. For example, the QP 159a associated with the encoding of input segment A 333a may be dynamically adjusted through the encoding process implemented by the transcoder device 134a-n responsible for transcoding input segment A 333a. To this end, the encoding of each input segment 333a-d comprises a corresponding QP 159a-d that may be adjusted through the course of encoding. When encoding a particular output segment 405a-d associated with a particular input segment 333a-d, the QP 159a-d may be initialized to an initial QP 502a-d. Additionally, the transcode manager 123 may direct each transcode process to process its respective QP 159a-d in such a way that it converges to a predetermined QP range 505a-d, as is discussed in further detail below.

In various embodiments, a transcode manager 123 is configured to manage the QP 159a-d for each transcoder process as the transcoder devices 134a-n process various series of input segments 333a-d. The encoder 158 of a transcoder device 134a-n may adjust the QP 159a-d as it performs the encoding process. Accordingly, each output segment 405a-d is associated with an initial QP 502a-d and a final QP, where the QP is used by each transcoder process to produce a corresponding encoded output segment 405a-d. When the final QP of a particular output segment 405a-d significantly varies from the initial QP 502a-d of the next output segment 405a-d to be presented, a disjointed QP transition occurs. Disjointed QP transitions may lead to visual artifacts between the output segments 405a-d that correspond to transcoded input segments 333a-d. Thus, the transcode manager 123 may be configured to influence the QP 159a-d of each output segment 405a-d being encoded to generate a relatively continuous QP 159 across a series of sequential output segments 405a-d such that there is a relatively small difference in QP 159 from one output segment to the next.

In one embodiment among others, the transcode manager 123 obtains the final QP value of a completely encoded output segment 405a-d and uses this final QP value to set the initial QP 502a-d of the next output segment 405a-d in presentation order. For example, the final QP of output segment A 405a may be used to initialize the initial QP 502 of output segment B 405b. In this case, the transcoder device 134a-n that is responsible for processing input segment A 333a communicates or otherwise reports the final QP associated with output segment A 405a to the transcode manager 123. The transcode manager 123 may then control the transcoder device 134a-n that is responsible for processing input segment B 333b by setting the initial QP 502b.

However, it may be the case that an input segment 333b is being concurrently transcoded along with the next input segment 333c to be presented. For example, by the time input segment B 333b completes the transcoding process, input segment C 333c has already begun the transcoding process. To address this case, various embodiments relate to directing the QP 159b to converge within a predetermined QP range 505b. The transcode manager may decide what an initial QP value and a final QP range are for each segment before each segment is encoded. For example, the transcode manager 123 may set a predetermined QP range 505b to instruct or otherwise direct the QP 159b to converge within the predetermined QP range 505b. The transcode manager 123 may determine a predetermined QP range 505b based on the initial value of QP 159c of output segment 405c, and instruct or otherwise direct the QP 159b to converge, in general, within the predetermined QP range 505b. This may reduce the risk of a disjointed QP between output segment B 405b and output segment C 405c, thereby resulting in high visual quality of the resulting output file (stream).

In various embodiments, the predetermined QP range 505a-d may be determined dynamically during the encoding of each input segment 333a-d. For example, during the encoding process, the QP 159a-d of one or more output segments may be used to determine the predetermined QP range 505a-d for a particular output segment. In alternative embodiments, the predetermined QP range 505a-d may be fixed for all encoders. In this respect each encoder is committed to the same predetermined QP range 505a-d. In another alternative embodiment, the predetermined QP range 505a-d may be approximately equal for all encoders encoding output segments 405a-d, and the QP range 505a-d may vary over time.

It may also be the case that an output segment 405d associated with a later presentation time is encoded before an output segment 405b, c associated with an earlier presentation time. For example, output segment D 405d begins the encoding process before the encoding of output segments B and C 405b, c. Various embodiments of the present disclosure are directed to obtaining an instant QP 159a-d of an output segment 405a-d that is presently being encoded and using the instant QP 159a-d to initialize the initial QP 502a-d of another output segment 405a-d. For example, the transcode manager 123 may obtain an instant QP of output segment A 405a while output segment A 405a is presently being encoded and use the instant QP as an initial QP 502d for output segment D 405d. Thus, the transcoding system 100 allows a transcode manager 123 to read QP 159a-d from transcoder devices 134a-d.

Figure 7:
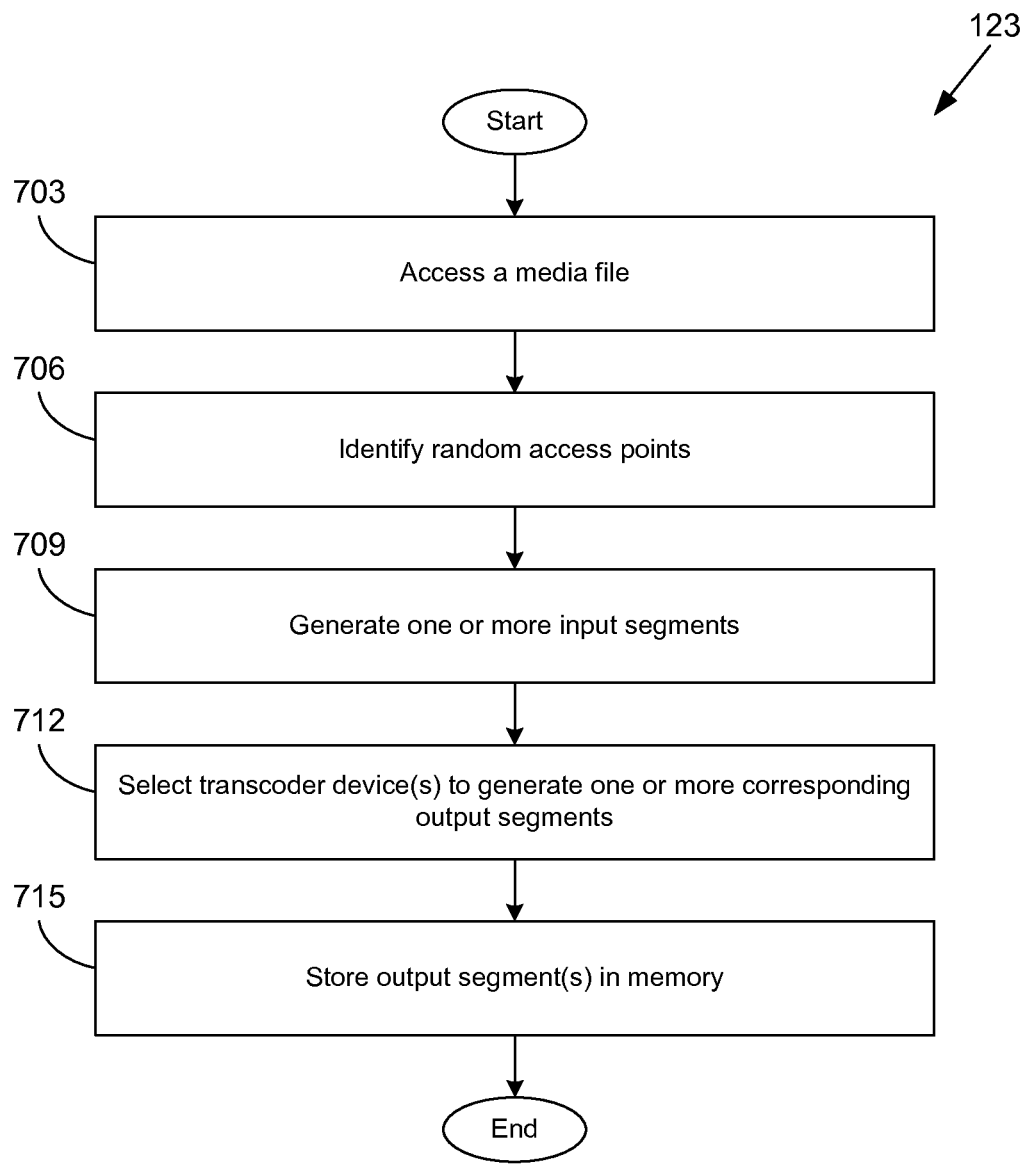
FIG. 7 is a flowchart illustrating examples of functionality implemented as portions of the transcode manager of FIG. 1, in accordance with various embodiments of the present disclosure.

Referring next to FIG. 7, shown is a flowchart illustrating examples of functionality implemented as portions of the transcode manager 123 of FIG. 1, in accordance with various embodiments of the present disclosure. It is understood that the flowchart of FIG. 7 provides merely an example of the many different types of functional arrangements that may be employed to implement the operation of the transcode manager 123 as described herein. As an alternative, the flowchart of FIG. 7 may be viewed as depicting an example of steps of a method implemented in the transcode manager 123 according to one or more embodiments.

To begin, at reference number 703, the transcode manager 123 accesses an input media file 115 (FIG. 1). The transcode manager 123 is configured to read the input media file from a source memory storage 112 (FIG. 1). The input media file 115 may be read as a video bit stream that expresses a series of pictures. At reference number 706, the transcode manager 123 identifies random access points (RAPs) 231a-c (FIG. 2). RAPs may be identified based on a RAP list 231 (FIG. 2). The RAP list 231 may be part of the metadata associated with the input media file 115. The RAP list 231 may also be calculated by the transcode manager 123. In this case, the transcode manager 123 analyzes the input media file 115 and identifies the locations of RAPs.

At reference number 709, the transcode manager 123 generates one or more input segments 333a-c (FIG. 3). Input segments 333a-c are generated based at least upon the location of the RAPs 231a-f (FIG. 3). Each input segment 333a-c may comprise a starting point, and an ending point. The starting point for each input segment 333a-c may be a respective RAP 231a-f in the RAP list 231. Furthermore, each input segment 333a-c may encompass a number of RAPs 231a-f. In various embodiments, the endpoint is a predetermined number of pictures beyond the last RAP 231a-f of a particular input segment 333a-c. A following input segment 333a-c may have a starting point of the last RAP 231a-f of the previous input segment 333a-c. In this respect, the series of input segments 333a-c are sequential, continuous, and overlapping.

At reference number 712, the transcode manager 123 selects one or more transcoder devices 134a-n (FIG. 1) to generate corresponding output segments 405a-f (FIG. 4). Each transcoder device 134a-n is configured to receive an input segment 333a-f (FIG. 4), transcode the input segment 333a-n, and generate a corresponding output segment 405a-f (FIG. 4). In various embodiments, transcoding of input segment 333a-n comprises decoding the input segment, forming an output segment from a subset of pictures of the input segment, and encoding the output segment to produce an encoded output segment. In various embodiments, output segments 405a-f obtained from the output of the transcoder devices 134a-f may be sequenced according to presentation order. When sequenced, output segments 405a-f are non-overlapping and contiguous. The transcode manager 123 may sequence the output segments 405a-f using a mux 143 (FIG. 1) and/or buffer memory. At reference number 715, the transcode manager 123 stores the output segments 405a-f in memory. For example, the output segments 405a-f may be sequenced, stitched together and stored as an output media file 121 (FIG. 1) in a destination memory storage 118 (FIG. 1). Stitching may involve concatenating each output segment 405a-f in presentation order.

Figure 8:
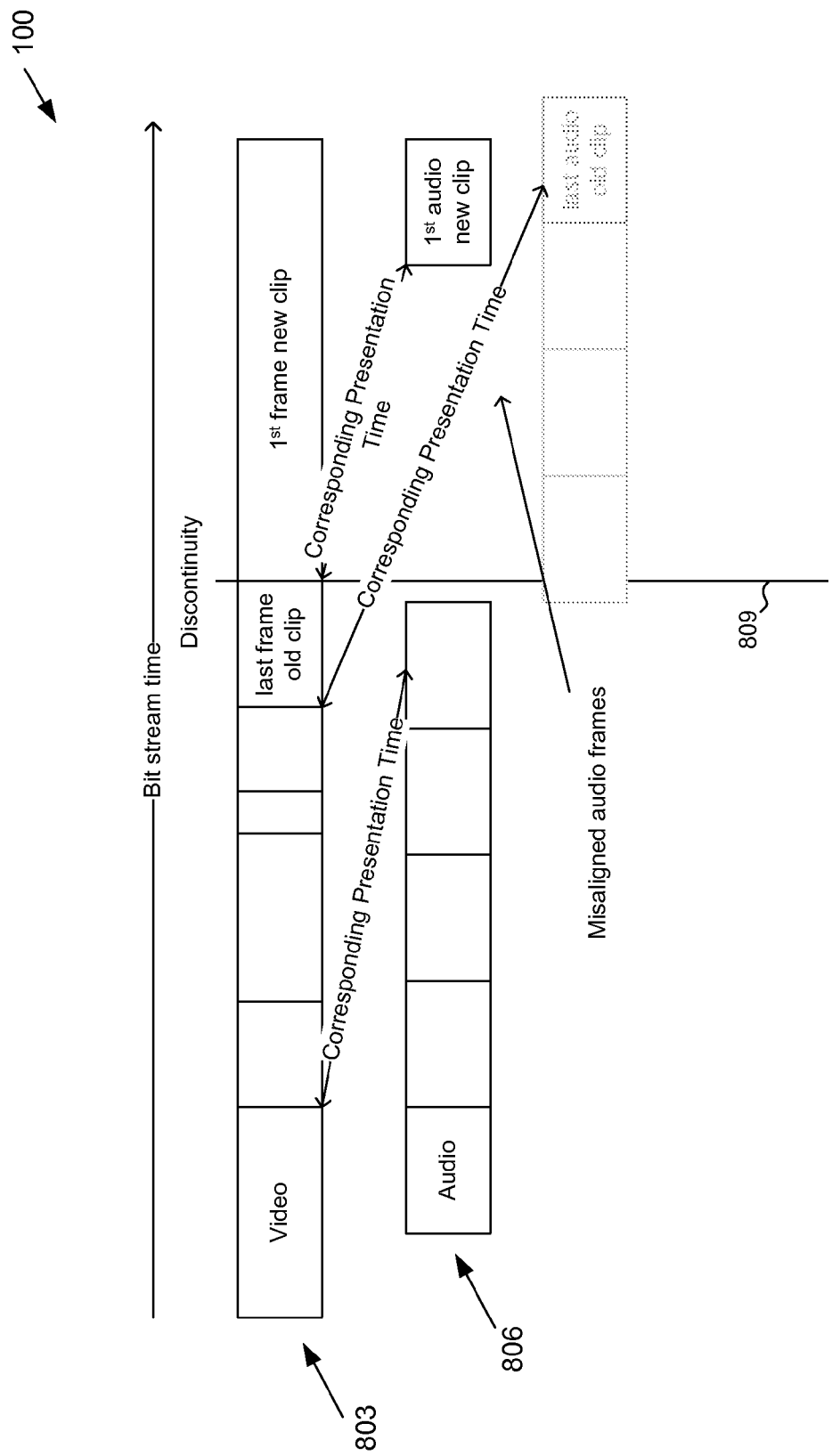
FIG. 8 is a diagram of an example of a bit stream in the transcoding system of FIG. 1, in accordance with various embodiments of the present disclosure.

Referring next to FIG. 8, shown is a diagram of an example of a bit stream in the transcoding system 100 of FIG. 1, in accordance with various embodiments of the present disclosure The bit stream represents a media file that is subject to transcoding by the transcoding system 100. The bit stream comprises a video stream 803 and an audio stream 806. The video stream 803 and audio stream 806 have associated with them timing information, for example time stamps, referencing a time line, where the timing information indicates the times when decoded pictures and audio frames would ideally be presented to a user. This timing information may be used to control the times when decoded pictures and audio frames are sent to an encoder 158 (FIG. 1). The video stream 803 comprises a series of pictures. Each picture may vary in bit size depending on the complexity and/or type of picture format. Although each picture varies in bit size, each picture represents a time interval that is inversely proportional to the frame rate. The audio stream 806 comprises a series of audio frames. A portion of the video stream 803 corresponds to a respective portion of the audio stream 806 in terms of presentation time. It may be the case that an audio frame with a particular presentation time has appeared later in the bit stream than a video frame that is associated with approximately the same presentation time appears in the bit stream. For example, a standard that applies to the bit stream may constrain the delay from bit stream arrival to presentation with a tighter constraint applying to audio than for video.

The bit stream of FIG. 8 further depicts a point of discontinuity 809. The point of discontinuity may be caused by splicing or otherwise inserting a second audio/video stream into a first audio/video stream. The point of discontinuity 809 separates an old clip from a new clip. The time base associated with the old clip is different from the time base associated with the new clip. Accordingly, it is likely that a significant shift in the time base of the bit stream occurs at the point of discontinuity 809. The time base may be represented by PCR values. Moreover, the transcoding system 100 may use the PCR values to maintain an internal time base 140 (FIG. 1) which corresponds to the time base of the bit stream. Thus, the internal time base 140 may realize a shift that corresponds to the shift in time base of the bit stream, which may be represented by the PCR values.

The point of discontinuity 809 results in a set of audio frames that are misaligned with the video frames. If the misalignment of audio frames is not addressed by the transcoding system, then during presentation, the audio will not be synchronized with the video. To detect and address discontinuity, various embodiments of the present disclosure are directed to embodiments for handling discontinuities after encoding, as is discussed with respect to at least FIGS. 9-10. Alternatively, to detect and address discontinuity, various embodiments of the present disclosure are directed to handling discontinuities before encoding is complete, as is discussed with respect to at least FIG. 11.

Handling Discontinuities after Encoding

Figure 9A:
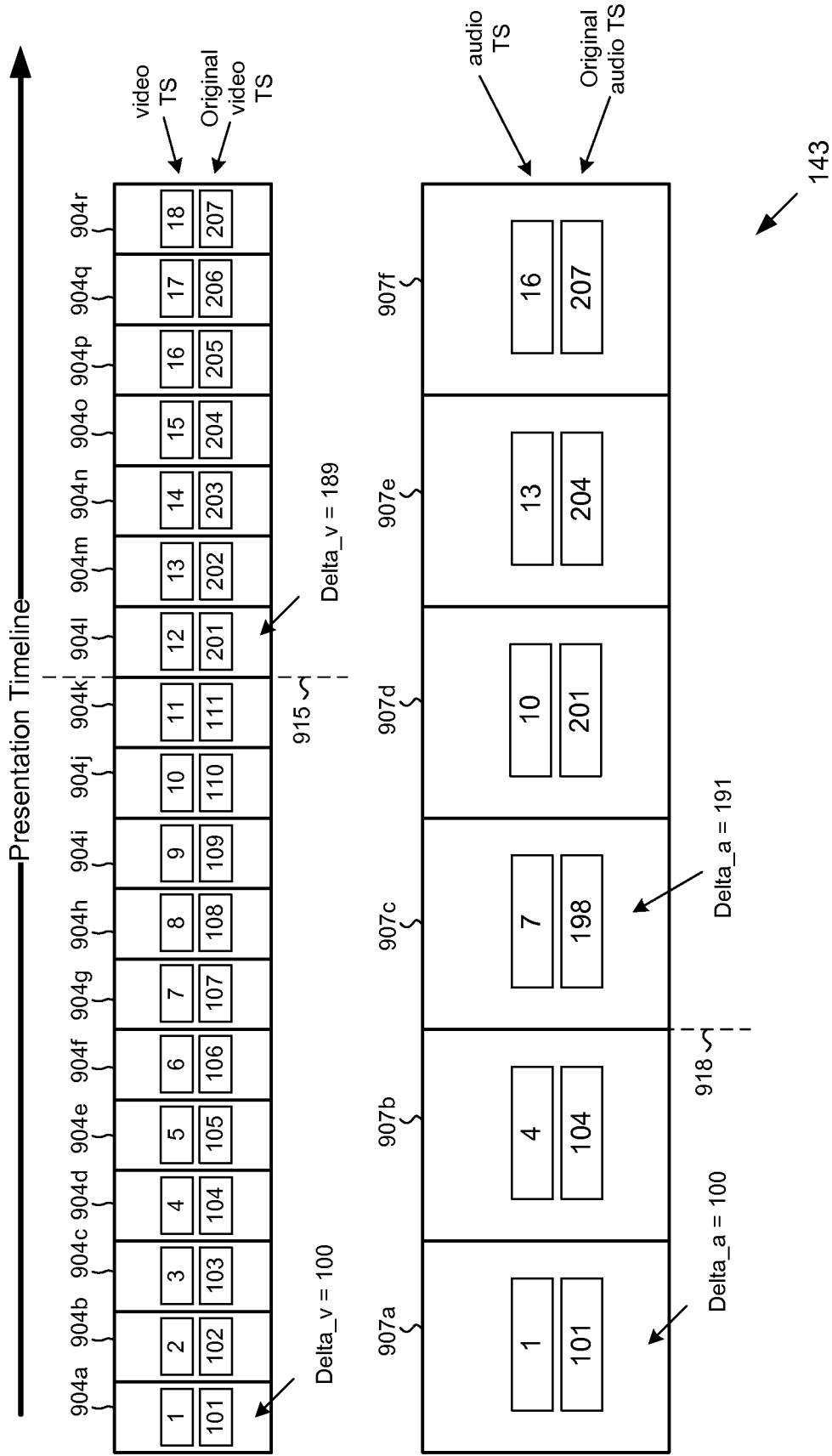
FIG. 9A is a diagram of an example of inputs to a multiplexer in the transcoding system of FIG. 1, in accordance with various embodiments of the present disclosure.

Turning to FIG. 9A, shown is a diagram of an example of a bit stream sent to a mux 143 in the transcoding system 100 of FIG. 1, in accordance with various embodiments of the present disclosure. The mux 143 may be configured to receive the audio outputs of one or more audio transcoder devices 134a-n (FIG. 1) and/or receive the video outputs of one or more video transcoder devices 134a-n. According to various embodiments, the mux 143 comprises one or more queues for storing the video outputs as series of pictures 904a-r and storing the audio outputs as series of audio frames 907a-f. For example, the mux 143 may stitch together the various transcoder device output segments for generating a transcoded audio stream and/or transcoded video stream or a transcoded multiplexed stream.

According to various embodiments, the transcoding system 100 is configured to maintain the original video time stamp data for each transcoded video frame throughout the transcoding process in the transcoding system 100. Similarly, the transcoding system 100 is configured to maintain the original audio time stamp data for each transcoded audio frame throughout the transcoding process in the transcoding system 100. According to various embodiments, the time stamps in FIG. 9A are presentation time stamps that indicate when an audio/video frame should be presented to a user.

In various embodiments, the transcoding system 100 generates video time stamps for each picture, where the video time stamps are newly generated and thus, supplementary with respect to the original video time stamps. The new video time stamps may be generated according to an internal time base 140 (FIG. 1). The transcoding system 100 may also generate audio time stamps for each audio frame, where the audio time stamps are newly generated and thus, supplementary with respect to the original audio time stamps. The new audio time stamps may be generated according to an internal time base 140 (FIG. 1). To this end, each transcoded picture 904 may comprise metadata indicating the original video time stamp and the video time stamp. Similarly, each transcoded audio frame 907 may comprise metadata indicating the original audio time stamp and the audio time stamp. Based at least upon the original video time stamps and the original audio time stamps, the mux 143 may detect a discontinuity and address the discontinuity.

FIG. 9A provides an example of a multiplexer 143 that receives a bit stream that has a discontinuity. The bit stream of FIG. 9A represents a version of the bit stream of FIG. 8 that has been transcoded before correcting any misalignment of audio and video frames.

As shown in the non-limiting example of FIG. 9A, a point of video discontinuity 915 exists between a first picture 904k and a second picture 904l. For example, the original video time stamps incrementally increase at a constant rate from one picture to the next from picture 904a to 904k, and from 904l to 904r, with a step change between 904k and 904l. At the point of video discontinuity 915 there is a significant change in value in the set of original video time stamps. This change in the time base, as indicated in the original video time stamps, is represented by a change in a delta_v value (video difference value) which is the difference between the original video time stamp of a picture and the video time stamp of that picture. A discontinuity may be detected by detecting a change in the delta_v value that exceeds a predetermined threshold. In this case, the value of delta_v shifts from 100 to 189 such that the change in delta_v is equal to 89 at picture 904l.

Similarly, a point of audio discontinuity 918 is shown to exist between a first audio frame 907b and a second audio frame 907c. For example, the original audio time stamps incrementally increase at a constant rate from one audio frame to the next from 907a to 907b, and from 907c to 907f, with a step change between 907b and 907c. At the point of audio discontinuity 918 there is a significant change in value in the set of original audio time stamps. This change in the time base, as indicated in the original audio time stamps, is represented by a change in a delta_a value (audio difference value) which is the difference between the original audio time stamp of an audio frame and the audio time stamp of that audio frame. In this case, the delta_a shifts from 100 to 191 such that the change in delta_a is equal to 91. Thus, as shown in FIG. 9A, the input bit stream contains a time base discontinuity that should be addressed by the mux 143.

Figure 9B:
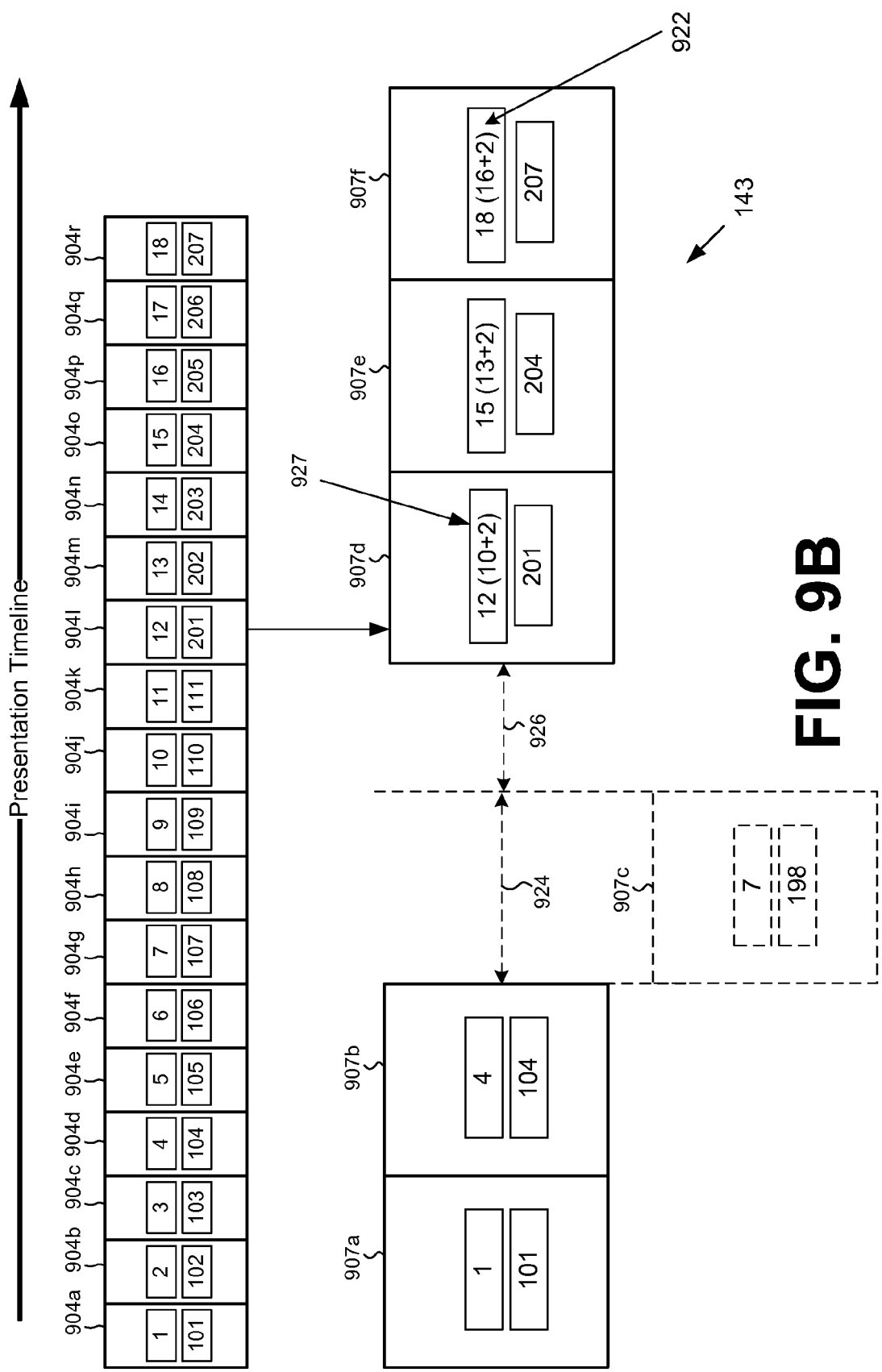
FIGS. 9B-C are diagrams of examples of outputs of the multiplexer in the transcoding system of FIG. 1, in accordance with various embodiments of the present disclosure.

Referring next to FIG. 9B, shown is a diagram of an example of an output bit stream of the mux 143 in the transcoding system of FIG. 1, in accordance with various embodiments of the present disclosure. FIG. 9B provides an example of detecting discontinuities and adjusting the bit stream of FIG. 9A to generate the output bit stream of FIG. 9B after encoding.

In FIG. 9B, the mux 143 responds to a detected discontinuity by adjusting the encoded audio stream according to an offset 926. The mux 143 determines a point of discontinuity in the video stream. This discontinuity may be detected based on the original time stamp and the time stamp assigned by the transcoding system 100. Even further, the discontinuity may be detected based on a change in delta_v.

In response to detecting a discontinuity in the video stream, the mux 143 determines those audio frames that are misaligned. In the example of FIG. 9B, audio misalignment starts at frame 907c. The misaligned frames may be identified based on the position of the audio discontinuity, the magnitude of the discontinuity and the audio frame interval.

The mux 143 is configured to drop any misaligned frames that would otherwise be presented before a corresponding discontinuity in the video stream. For example, referring to FIG. 9B, the mux 143 drops audio frame 907c. Alternatively, the mux 143 drops audio frames that do not correspond in presentation time to video; this situation may result from a splice that caused the discontinuity. The mux 143 may align those audio frames 907d-e that follow a misaligned audio frame 907c in terms of presentation time. This alignment may be made according to an offset 926. As shown in the non-limiting example of FIG. 9B, the offset 926 is based on mapping a particular picture 904l of the video stream to a corresponding audio frame 907d of the audio stream. The particular picture 904l is mapped to the corresponding audio frame 907d based on matching an original video time stamp (e.g., 201) to an original audio time stamp (e.g., 201). By inserting an offset 926, the particular audio frame 907d is shifted in terms of presentation time and a subsequent portion of audio frames 907e-f are similarly shifted. In the non-limiting example of FIG. 9B, the amount of shift is 2, which is equal to the offset 926. In various embodiments, the amount of shift 927 is determined based on the difference between the delta_a after the discontinuity (e.g., 191) and the delta_v after the discontinuity (e.g., 189).

Thus, the time stamp for the particular audio frame 907d and the time stamps of the subsequent audio frames 907e-f are updated according to the amount of shift (e.g., 2). By updating the audio time stamps of these audio frames 907d-f, the audio frames 907d-f are effectively aligned to the video stream in terms of presentation time. In various embodiments, the offset is not equal to an integer audio frame interval.

Figure 9C:
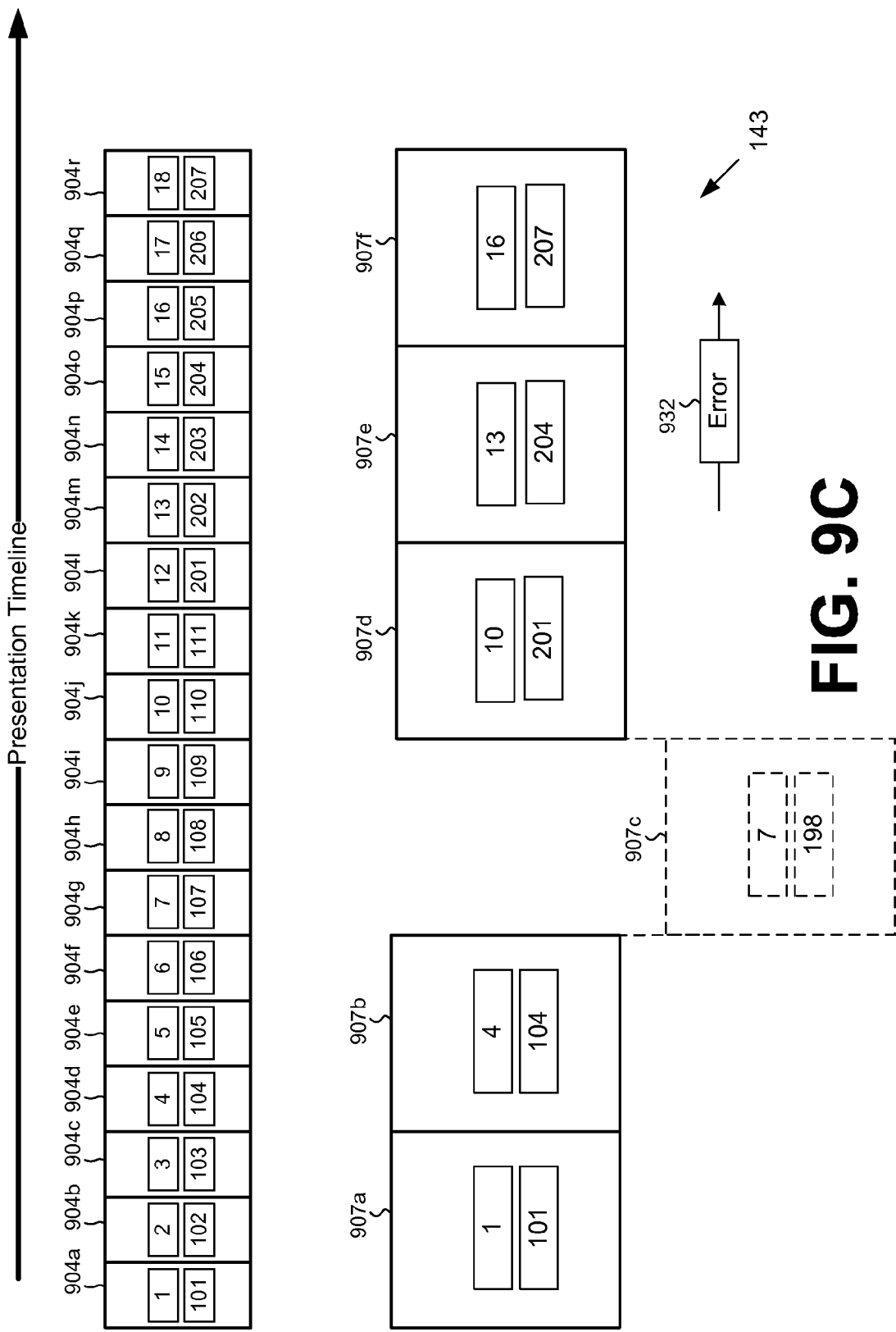

Referring next to FIG. 9C, shown is a diagram of an example of an output bit stream of the mux 143 in the transcoding system of FIG. 1, in accordance with various embodiments of the present disclosure. FIG. 9C provides an example of detecting and adjusting the input bit stream of FIG. 9A to generate the output bit stream of FIG. 9C after encoding. Specifically, FIG. 9C depicts an example of dropping misaligned audio frames without inserting an offset 926 (FIG. 9B). By refraining from inserting an offset 926 in the audio stream, audio frames are separated by an integer audio frame interval. This is due to the fact that, in this example, an offset 926 is not equal to an integer frame interval length. As at least one benefit of separating audio frames according to an integer interval, it may be easier for a downstream decoder to fill in the frame-aligned gap of the transcoded bit stream.

However, without inserting an offset 926, an audio/video synchronization error 932 is generated. The audio/video synchronization error 932 results from a mismatch between an original video time stamp and a corresponding original audio time stamp. The audio/video synchronization error 932 is equal to the offset 926 of FIG. 9B.

In FIGS. 9A-C, the mux 143 may be configured to process a video stream that has been segmented for parallel processing while the audio stream has been serially processed by a single audio transcoder device 134a-n. Alternatively, the mux 143 may be configured to process an audio stream that has been segmented for parallel processing while the video stream has been serially processed by a single video transcoder device 134a-n.

Figure 10:
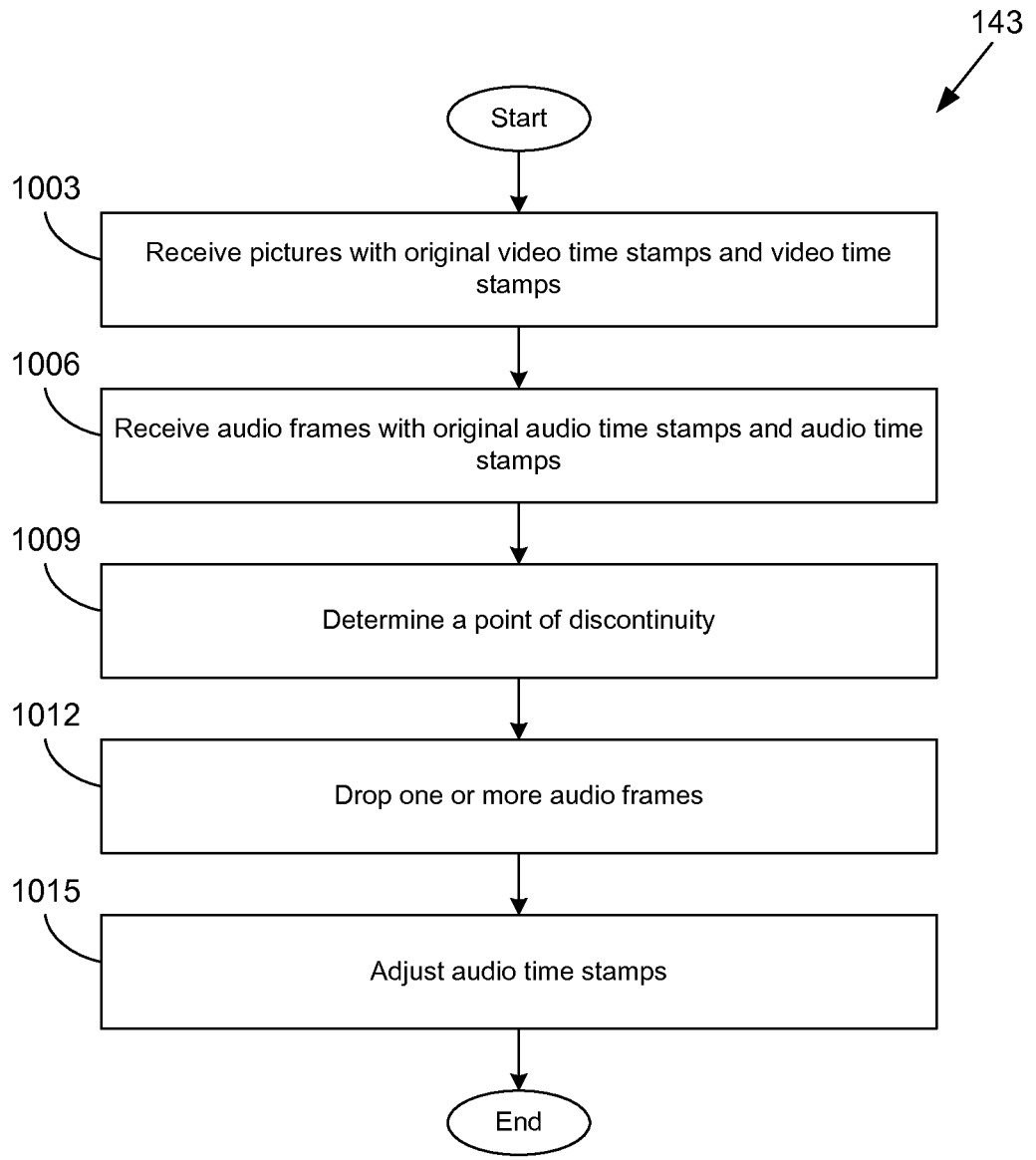
FIG. 10 is a flowchart illustrating examples of functionality implemented as portions of the multiplexer of FIGS. 9A-C, in accordance with various embodiments of the present disclosure.

Referring next to FIG. 10, shown is a flowchart illustrating examples of functionality implemented as portions of a mux 143 of FIGS. 9A-C, in accordance with various embodiments of the present disclosure. It is understood that the flowchart of FIG. 10 provides merely an example of the many different types of functional arrangements that may be employed to implement the operation of the mux 143 as described herein. As an alternative, the flowchart of FIG. 10 may be viewed as depicting an example of steps of a method implemented in the mux 143 according to one or more embodiments.

To begin, at reference number 1003, the mux 143 receives pictures with the original video time stamps and the video time stamps that have been assigned by the transcoding system 100. Each picture may be a transcoded picture received at the output of a corresponding transcoder device 134 (FIG. 1). Furthermore, each picture may be associated with metadata that comprises various time stamp data. At reference number 1006, the mux 143 receives audio frames with the original audio time stamps and the audio time stamps that have been assigned by the transcoding system 100. Each audio frame may be a transcoded audio frame received at the output of a corresponding transcoder device 134. Furthermore, each audio frame may be associated with metadata that comprises various time stamp data.

At reference number 1009, the mux 143 determines a point of video discontinuity 915 (FIG. 9). For example, the mux 143 may track a delta_v value for each picture, where the delta_v value is the difference between the video time stamp and the original video time stamp for the picture. If the delta_v value substantially changes, such that it exceeds a predetermined threshold change, then the mux 143 determines that location of the change in delta_v to be the point of video discontinuity 915.

At reference number 1012, the mux 143 drops one or more audio frames from the audio stream. In response to detection of a discontinuity, the mux 143 identifies those audio frames that are misaligned and drops the misaligned audio frames. A misaligned audio frame may be defined as an audio frame that is not associated with one or more corresponding video frames. For example, a misaligned audio frame may be an audio frame that has an original audio frame time stamp and is not associated with a video frame that has a corresponding original video time stamp. In the non-limiting example of FIG. 9A, a misaligned audio frame 907c has an original time stamp of "198" such that this original audio time stamp does not correspond to an original video time stamp in the video stream.

At reference number 1015, the mux 143 aligns the audio frames to the video frames according to the discontinuity. If audio frames are not aligned, then an audio/video synchronization error 932 (FIG. 9C) may result. To address this error, the mux 143 may align the audio stream to the video stream by inserting an offset 926 (FIG. 9B). According to various embodiments, the offset 926 is based on the difference between delta_a and delta_v. By inserting an offset 926, the mux 143 may update the audio time stamps for those audio frames that are positioned beyond the inserted offset 926 by shifting them according to a shift amount. The shift amount may be the difference between delta_a and delta_v.

Handling Discontinuities Before Encoding

As an alternative to detecting and addressing discontinuities in a bit stream after encoding, for example, in a mux 143 (FIG. 1), discontinuities may be detected and addressed during the encoding process. A transcoding system 100 (FIG. 1) may detect and address discontinuities for bit streams such as, for example, the bit stream of FIG. 8, as the bit stream is sent to audio/video encoders.

Figure 11:
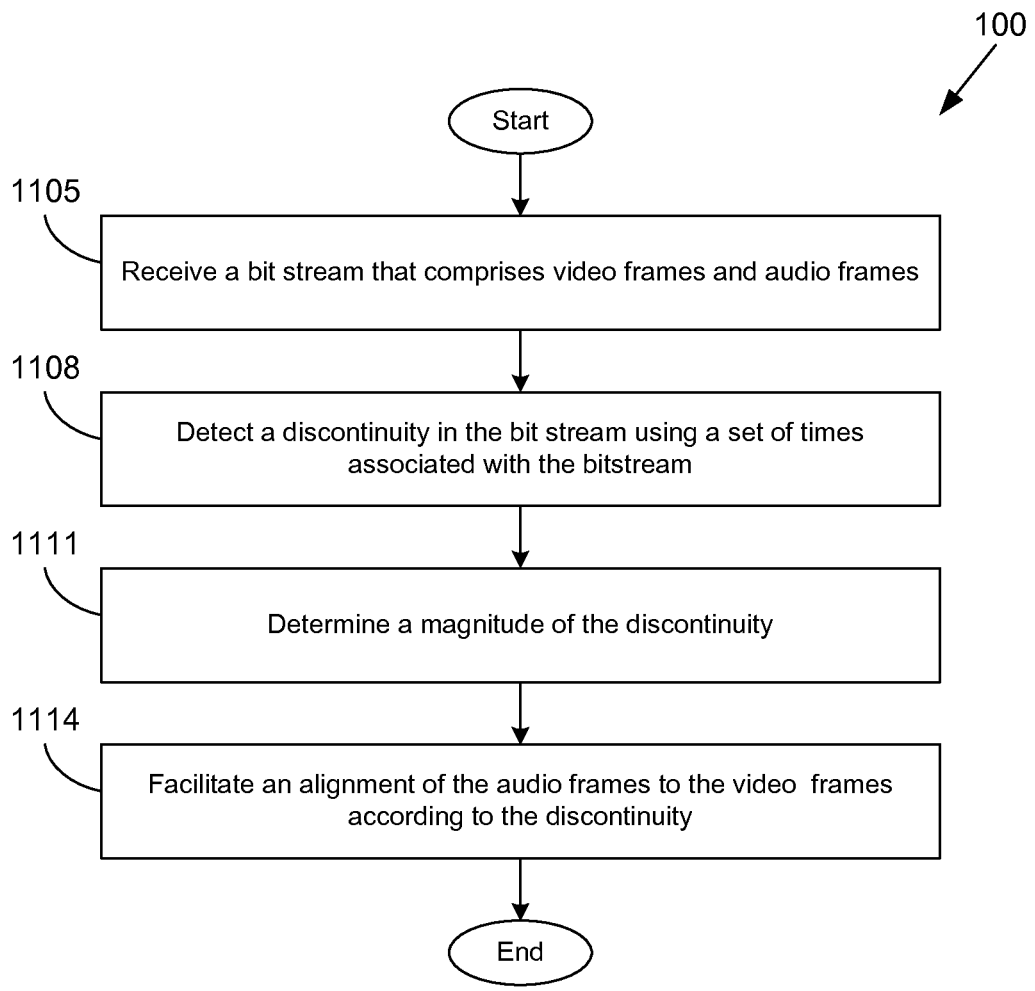
FIG. 11 is a flowchart illustrating examples of functionality implemented as portions of the transcoding system of FIG. 1, in accordance with various embodiments of the present disclosure.

Referring to FIG. 11, shown is a flowchart illustrating examples of functionality implemented as portions of the transcoding system 100 of FIG. 1, in accordance with various embodiments of the present disclosure. It is understood that the flowchart of FIG. 11 provides merely an example of the many different types of functional arrangements that may be employed to implement the operation of the transcoding system 100 as described herein. As an alternative, the flowchart of FIG. 11 may be viewed as depicting an example of steps of a method implemented in the transcoding system 100 according to one or more embodiments.

To begin, at reference number 1105, the transcoding system receives a bit stream that comprises video frames and audio frames. The bit stream may be, for example, the bit stream of FIG. 8. The transcoding system 100 may access the bit stream from a source memory storage 112 (FIG. 1). It may be the case that the bit stream has been spliced or otherwise processed such that a new audio/video clip is inserted into an old audio/video clip. As a result, the bit stream includes a point of discontinuity 809 (FIG. 8). At reference number 1108, the transcoding system 100 detects a discontinuity in the bit stream using a set of times associated with the bit stream. For example, a transcode manager 123 (FIG. 1) may analyze PCR values, a set of video time stamps, and/or a set of audio time stamps to determine a point of discontinuity. Specifically, the transcode manager 123 may generate an internal time base 140 (FIG. 1) by tracking PCR values in the bit stream. In this respect, the transcoding system 100 expects particular PCR values, with a degree of certainty, based on the time base. Unexpected PCR values indicate the presence of a discontinuity. That is to say, a significant change in PCR values with respect to expected values reflects a discontinuity. Thus, a discontinuity may be detected before the bit stream is encoded. In addition, a discontinuity detected in a bit stream may be considered to indicate a discontinuity in the audio and video streams such that the audio and video data that are after the detected bit stream discontinuity are associated with audio and video data that are intended to be presented after the discontinuity.

At reference number 1111, the transcoding system 100 determines a magnitude of the discontinuity. According to various embodiments, the magnitude of the discontinuity is determined based on the difference between an expected PCR value and an actual PCR value. The expected PCR value may be determined based on a quantity of frame intervals and the internal time base 140. Once the internal time base 140 is locked according to the PCR values in the bit stream, the degree in which a subsequent PCR deviates from an expected PCR value correlates with the magnitude of the discontinuity. In various embodiments, a discontinuity that is represented by a shift in the PCR values causes the transcoding system 100 to update the internal time base 140 to account for the subsequent shifted PCR values.

At reference number 1114, the transcoding system 100 facilitates an alignment of the audio frames to the video frames according to the discontinuity. For example, the transcode manager 123 determines those audio frames that are misaligned. In the example of FIG. 8, misaligned audio frames are depicted as being positioned around the point of discontinuity 809 (FIG. 8) and before the first audio of the new clip. The misaligned frames may be identified based on the position of the audio discontinuity, the magnitude of the discontinuity, and the audio frame interval. The transcode manager 123 facilitates aligning audio frames to the video frames by sending a signal to each audio transcoder device 134a-n (FIG. 1) indicating that the audio transcoder devices 134 are to drop misaligned frames. In other embodiments, the audio frames are aligned by a mux 143 (FIG. 1) in response to detecting a discontinuity in the bit stream.

According to various embodiments, the transcode manager 123 and/or transcoder device 134a-n inserts an offset into the audio stream to align the audio stream to the video stream. According to the offset, the audio frames that are positioned beyond the misaligned frames are assigned updated presentation time stamps. These updated presentation time stamps are assigned to ensure that the audio frames are synchronized with the corresponding video frames. However, by inserting an offset, a portion of the audio frames are not separated by a constant frame interval.

The flowcharts of FIGS. 7, 10, and 11 show the functionality and operation of an implementation of portions of the transcoding system. If embodied in software, each reference number, depicted as a block, may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the transcode manager 123 in a computer system or other system. The program instructions may be stored in a memory. The machine code may be converted from the source code, etc. If embodied in hardware, each block may represent a circuit or a number of interconnected circuits to implement the specified logical function(s).

Although the flowcharts of FIGS. 7, 10, and 11 show a specific order of execution, it is understood that the order of execution may differ from that which is depicted. For example, the order of execution of two or more blocks may be scrambled relative to the order shown. Also, two or more blocks shown in succession in FIGS. 7, 10, and 11 may be executed concurrently or with partial concurrence. Further, in some embodiments, one or more of the blocks shown in FIGS. 7, 10, and 11 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code, for example, code or instructions to execute portions of the transcode manager 123 (FIG. 1), the transcoder devices 134a-n (FIG. 1), the time base 140 (FIG. 1), the mux 143 (FIG. 1), or any other component in the transcoding system 100 may be embodied in any non-transitory computer-readable medium for use by or in connection with an instruction execution system such as, for example, the transcoding system 100 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system, comprising:
a memory for storing a media file, the media file comprising a video stream and an audio stream, the video stream comprising a series of pictures and a plurality of random access points, at least a portion of the series of pictures being associated with original video time stamps, the audio stream comprising a series of audio frames, at least a portion of the series of audio frames being associated with original audio time stamps;
a transcode manager configured to divide the video stream into a plurality of input segments based at least in part on the plurality of random access points, each of the plurality of input segments comprising respective subsets of the series of pictures, the transcode manager configured to generate overlapping input segments such that a set of pictures at an end of a first input segment is the same as a set of pictures at the beginning of an adjacent second input segment by:
creating the first input segment by identifying a first random access point as a start point of the first input segment, identifying a second random access point according to a target input segment length, and determining an end point for the first input segment by adding a first set of pictures beyond the second random access point, and
creating the second input segment by using the second random access point as a start point of the second input segment, identifying a third random access point according to the target input segment length, and determining an end point for the second input segment by adding a second set of pictures beyond the third random access point, wherein the second input segment includes the first set of pictures;
the transcode manager being further configured to assign video time stamps to at least a portion of the series of pictures, the transcode manager being further configured to assign audio time stamps to at least a portion of the series of audio frames;
a plurality of video transcoder devices configured to transcode the input segments in parallel to generate corresponding output segments;
an audio transcoder device configured to transcode at least a portion of the audio stream to generate a transcoded audio stream; and
a multiplexer configured to:
aggregate the corresponding output segments to generate a transcoded video stream, the transcoded video stream comprising the video time stamps and the original video time stamps;
determine a discontinuity in the media file based at least upon the video time stamps and the original video time stamps or based at least upon the audio time stamps and the original audio time stamps; and
align the transcoded audio stream with the transcoded video stream to correct misalignment of the audio stream and the video stream caused by the determined discontinuity.

2. The system of claim 1, wherein the multiplexer is configured to aggregate the output segments and the transcoded audio stream to generate a transcoded media file.

3. The system of claim 1, wherein the multiplexer is configured to align at least a portion of the transcoded audio stream by shifting at least one audio time stamp among the audio time stamps according to an offset.

4. The system of claim 1, wherein the video time stamps are assigned based at least upon a time base, wherein the audio time stamps are assigned based at least upon the time base.

5. The system of claim 1, wherein the video time stamps, the original video time stamps, the audio time stamps, and the original audio time stamps specify respective presentation times.

6. The system of claim 1, wherein the audio transcoder device comprises a single audio transcoder device to serially process the audio stream.

7. A method comprising:
accessing a media file, the media file comprising a video stream and an audio stream, the video stream being associated with a set of original video time stamps, the audio stream being associated with a set of original audio time stamps, wherein the video stream comprises a plurality of random access points;

assigning at least a portion of a plurality of pictures in the video stream respective video time stamps based at least upon a time base;
dividing the video stream into a plurality of video segments based at least in part on the plurality of random access points, dividing the video stream into the video segments comprising generating overlapping video segments such that a set of pictures at an end of a first video segment is the same as a set of pictures at the beginning of an adjacent second video segment by:
creating the first input segment by identifying a first random access point as a start point of the first input segment, identifying a second random access point according to a target input segment length, and determining an end point for the first input segment by adding a first set of pictures beyond the second random access point;
creating the second input segment by using the second random access point as a start point of the second input segment, identifying a third random access point according to the target input segment length, and determining an end point for the second input segment by adding a second set of pictures beyond the third random access point, wherein the second input segment includes the first set of pictures; and
transcoding, using a plurality of video transcoder devices, at least a portion of the plurality of video segments in parallel to generate a transcoded video stream.

8. The method of claim 7, wherein the original video time stamps and the original audio time stamps specify respective presentation times.

9. The method of claim 8, further comprising:
determining a video difference value between an original video time stamp and a video time stamp to generate a set of video difference values; and
detecting a point of video discontinuity based at least upon a change within the set of video difference values.

10. The method of claim 7, further comprising:
aligning the transcoded audio stream to the transcoded video stream in response to detecting a point of video discontinuity; and
determining a misaligned audio frame in the audio stream, wherein aligning comprises removing the misaligned audio frame.

11. The method of claim 7, further comprising in response to determining the discontinuity, adjusting at least a portion of the audio time stamps to shift the transcoded audio stream.

12. The method of claim 11, further comprising dividing the audio stream into a plurality of audio segments, wherein transcoding the audio stream comprises transcoding at least a portion of the plurality of audio segments in parallel using a plurality of audio transcoder devices.

13. One or more non-transitory computer-readable storage media having instructions stored thereon that, when executed by one or more processors, cause the one or more processors to perform operations comprising:
accessing a media file, the media file comprising a video stream and an audio stream, the video stream being associated with a set of original video time stamps, the audio stream being associated with a set of original audio time stamps, wherein the video stream comprises a plurality of random access points;
assigning at least a portion of a plurality of pictures in the video stream respective video time stamps based at least upon a time base;
dividing the video stream into a plurality of video segments based at least in part on the random access points, dividing the video stream into the video segments comprising generating overlapping video segments by:
creating a first input segment by identifying a first random access point as a start point of the first input segment, identifying a second random access point according to a target input segment length, and determining an end point for the first input segment by adding a first set of pictures beyond the second random access point;
creating a second input segment by using the second random access point as a start point of the second input segment, identifying a third random access point according to the target input segment length, and determining an end point for the second input segment by adding a second set of pictures beyond the third random access point, wherein the second input segment includes the first set of pictures; and
transcoding, using a plurality of video transcoder devices, at least a portion of the plurality of video segments in parallel to generate a transcoded video stream.

14. The one or more non-transitory computer-readable storage media of claim 13, wherein the original video time stamps and the original audio time stamps specify respective presentation times.

15. The one or more non-transitory computer-readable storage media of claim 14, wherein the original video time stamps and the original audio time stamps specify respective presentation times.

16. The one or more non-transitory computer-readable storage media of claim 13, further comprising:
aligning the transcoded audio stream to the transcoded video stream in response to detecting a point of video discontinuity; and
determining a misaligned audio frame in the audio stream, wherein aligning comprises removing the misaligned audio frame.

17. The one or more non-transitory computer-readable storage media of claim 13, further comprising in response to determining the discontinuity, adjusting at least a portion of the audio time stamps to shift the transcoded audio stream.

18. The one or more non-transitory computer-readable storage media of claim 17, further comprising dividing the audio stream into a plurality of audio segments, wherein transcoding the audio stream comprises transcoding at least a portion of the plurality of audio segments in parallel using a plurality of audio transcoder devices.

19. The system of claim 1, wherein the transcode manager is configured to determine a random access points list indicating locations of the plurality of random access points in the video stream.

20. The system of claim 1, wherein the end points for the first and second input segments are determined by adding at least one of a number of pictures, an amount of time, a number of bits, a number of random access points encompassed by the plurality of input segments beyond the second random access point and third random access point respectively.

21. The system of claim 1, wherein the wherein the video stream is misaligned with the audio stream.

22. The system of claim 1, wherein the plurality of input segments comprise a first input segment sent to a first transcoder device of the plurality of transcoder devices and a second input segment sent to a second transcoder device of the plurality of transcoder devices, the first input segment overlapping with the second input segment by the first set of pictures.

23. The system of claim 22, wherein the first transcoder device is configured to:
- receive data from a second transcoder device relating to transcoding of a picture in the second input segment; and
- transcode the same picture in the first input segment using the data.

* * * * *